US010486260B2

(12) United States Patent
Hoffa et al.

(10) Patent No.: US 10,486,260 B2
(45) **Date of Patent: *Nov. 26, 2019**

(54) SYSTEMS, METHODS, AND DEVICES FOR TRANSMITTING INFORMATION TO THERMAL PROCESSING SYSTEMS

(71) Applicant: Hypertherm, Inc., Hanover, NH (US)

(72) Inventors: Michael Hoffa, Lebanon, NH (US); E. Michael Shipulski, Etna, NH (US); Brett A. Hansen, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 680 days.

This patent is subject to a terminal disclaimer.

(21) Appl. No.: 13/838,919

(22) Filed: Mar. 15, 2013

(65) Prior Publication Data

US 2013/0264317 A1 Oct. 10, 2013

Related U.S. Application Data

(63) Continuation-in-part of application No. 13/560,059, filed on Jul. 27, 2012, now abandoned, which is a (Continued)

(51) Int. Cl.

| | |
|---|---|
| ***G06K 7/10*** | (2006.01) |
| ***B23K 10/00*** | (2006.01) |
| ***H05H 1/34*** | (2006.01) |
| ***B23K 9/16*** | (2006.01) |
| ***B23K 9/32*** | (2006.01) |

(Continued)

(52) U.S. Cl.

CPC .............. *B23K 10/006* (2013.01); *B23K 9/16* (2013.01); *B23K 9/32* (2013.01); *B23K 10/00* (2013.01); *B23K 10/02* (2013.01); *B23K 26/21* (2015.10); *B23K 26/38* (2013.01); *B23K 26/702* (2015.10); *H05H 1/34* (2013.01); *H05H 2001/3494* (2013.01)

(58) Field of Classification Search

CPC ......... B23K 35/02; B23K 35/00; B23K 37/02

USPC ...... 219/137.2, 137.31, 138, 130.01, 121.54, 219/121.57, 121.48; 340/593, 593.13, 340/593.17

See application file for complete search history.

(56) References Cited

U.S. PATENT DOCUMENTS

| | | | | |
|---|---|---|---|---|
| 2,985,050 A | | 5/1961 | Schwatcha | |
| 3,010,012 A | * | 11/1961 | Tuthill .................... | B23K 9/12 219/137.71 |

(Continued)

FOREIGN PATENT DOCUMENTS

| | | |
|---|---|---|
| CA | 2 439 213 | 10/2006 |
| EP | 0508482 | 10/1992 |

(Continued)

OTHER PUBLICATIONS

Torchmate® Arc Voltage Torch Height Control—Operation Manual, Applied Robotics, Inc., Oct. 2005, pp. 1-19.

(Continued)

*Primary Examiner* — Jimmy Chou

(74) *Attorney, Agent, or Firm* — Proskauer Rose LLP

(57) ABSTRACT

In some aspects, a replaceable consumable component for performing a cutting or welding operation can include a body and a readable data storage device coupled to the body or integrated within the body, wherein the data storage device contains an operation instruction for a cutting or welding device.

16 Claims, 10 Drawing Sheets

100
102
115
120
127
104
105
128
110
125

Related U.S. Application Data continuation-in-part of application No. 13/439,259, filed on Apr. 4, 2012.

(51) Int. Cl.

| | |
|---|---|
| ***B23K 10/02*** | (2006.01) |
| ***B23K 26/38*** | (2014.01) |
| ***B23K 26/70*** | (2014.01) |
| ***B23K 26/21*** | (2014.01) |

(56) References Cited

U.S. PATENT DOCUMENTS

| | | | | | |
|---|---|---|---|---|---|
| 3,018,360 | A * | 1/1962 | Engel | B23K 9/1093 | 219/137.31 |
| 3,518,401 | A * | 6/1970 | Mathews | B23K 9/091 | 219/130.51 |
| 3,602,683 | A | 8/1971 | Hishida et al. | | |
| 4,125,754 | A | 11/1978 | Wasserman et al. | | |
| 4,497,029 | A * | 1/1985 | Kiyokawa | G05B 19/182 | 318/563 |
| 4,519,835 | A * | 5/1985 | Gauvin | B01J 19/088 | 75/10.19 |
| 4,588,880 | A * | 5/1986 | Hesser | B07C 5/34 | 235/376 |
| 4,733,052 | A * | 3/1988 | Nilsson | B23K 9/28 | 219/137.44 |
| 4,742,470 | A * | 5/1988 | Juengel | G05B 19/128 | 340/10.34 |
| 4,929,811 | A * | 5/1990 | Blankenship | H05H 1/34 | 219/121.54 |
| 5,018,670 | A | 5/1991 | Chalmers | | |
| 5,050,106 | A * | 9/1991 | Yamamoto | G07C 3/00 | 340/10.51 |
| 5,086,655 | A | 2/1992 | Fredericks et al. | | |
| 5,099,226 | A * | 3/1992 | Andrews | G06K 7/0008 | 340/13.26 |
| 5,248,867 | A * | 9/1993 | Ohba | B23H 1/04 | 219/69.15 |
| 5,309,683 | A | 5/1994 | Hockett | | |
| 5,357,076 | A | 10/1994 | Blankenship | | |
| 5,381,487 | A | 1/1995 | Shamos | | |
| 5,388,965 | A | 2/1995 | Fehn | | |
| 5,390,964 | A * | 2/1995 | Gray, Jr. | B29C 61/0608 | 138/104 |
| 5,400,389 | A * | 3/1995 | Niiyama | H04W 8/24 | 455/186.1 |
| 5,440,477 | A | 8/1995 | Rohrberg et al. | | |
| 5,500,512 | A | 3/1996 | Goldblatt | | |
| 5,556,562 | A * | 9/1996 | Sorenson | B23K 9/295 | 219/137.61 |
| 5,653,264 | A | 8/1997 | Atkinson | | |
| 5,717,187 | A * | 2/1998 | Rogozinski | H05H 1/36 | 219/121.51 |
| 5,860,849 | A | 1/1999 | Miller | | |
| 5,994,663 | A | 11/1999 | Lu | | |
| 6,047,579 | A * | 4/2000 | Schmitz | B30B 15/26 | 483/28 |
| 6,130,407 | A * | 10/2000 | Villafuerte | B23K 9/0956 | 219/130.01 |
| 6,133,542 | A * | 10/2000 | Dvorak | B23K 10/027 | 219/121.46 |
| 6,201,207 | B1 * | 3/2001 | Maruyama | B23K 7/102 | 219/121.39 |
| 6,248,975 | B1 | 6/2001 | Lanouette et al. | | |
| 6,259,059 | B1 * | 7/2001 | Hsu | B23K 9/0735 | 219/130.31 |
| 6,267,291 | B1 * | 7/2001 | Blankenship | B23K 9/1062 | 219/136 |
| 6,326,583 | B1 | 12/2001 | Hardwick et al. | | |
| 6,409,476 | B2 | 6/2002 | Mills | | |
| 6,479,793 | B1 | 11/2002 | Wittmann et al. | | |
| 6,510,984 | B2 | 1/2003 | Blankenship et al. | | |
| 6,539,813 | B1 | 4/2003 | Horiuchi et al. | | |
| 6,563,085 | B2 * | 5/2003 | Lanouette | B23K 9/095 | 219/130.5 |
| 6,657,162 | B1 * | 12/2003 | Jung | B23K 9/285 | 219/137.61 |
| 6,659,098 | B1 | 12/2003 | Sekiya | | |
| 6,693,252 | B2 | 2/2004 | Zhang et al. | | |
| 6,707,304 | B2 * | 3/2004 | Buhler | B23K 20/004 | 219/69.11 |
| 6,717,096 | B2 | 4/2004 | Hewett et al. | | |
| 6,729,468 | B1 | 5/2004 | Dobmeier | | |
| 6,772,040 | B1 | 8/2004 | Picard et al. | | |
| 6,781,085 | B2 | 8/2004 | Ulrich et al. | | |
| 6,933,462 | B2 | 8/2005 | Iriyama et al. | | |
| 6,960,737 | B2 | 11/2005 | Tatham | | |
| 6,980,704 | B2 | 12/2005 | Kia et al. | | |
| 6,992,262 | B2 * | 1/2006 | Matus | B23K 10/006 | 219/121.39 |
| 6,995,545 | B2 | 2/2006 | Tracy et al. | | |
| 7,030,337 | B2 | 4/2006 | Baker et al. | | |
| 7,032,814 | B2 * | 4/2006 | Blankenship | B23K 9/1062 | 219/54 |
| 7,115,833 | B2 | 10/2006 | Higgins et al. | | |
| 7,186,944 | B2 * | 3/2007 | Matus | B23K 9/0956 | 219/121.39 |
| 7,307,533 | B2 * | 12/2007 | Ishii | G06K 7/0008 | 340/10.1 |
| 7,358,458 | B2 * | 4/2008 | Daniel | B23K 9/0956 | 219/130.01 |
| 7,375,302 | B2 * | 5/2008 | Twarog | B23K 10/02 | 219/121.48 |
| 7,411,154 | B2 | 8/2008 | Fosbinder et al. | | |
| 7,645,960 | B2 * | 1/2010 | Stava | B23K 9/1062 | 219/130.21 |
| 7,671,294 | B2 | 3/2010 | Belashchenko et al. | | |
| 7,680,625 | B2 * | 3/2010 | Trowbridge, Jr. | F17D 5/00 | 340/605 |
| 7,843,334 | B2 | 11/2010 | Kumagai et al. | | |
| 8,035,487 | B2 | 10/2011 | Malackowski | | |
| 8,085,150 | B2 | 12/2011 | Oberle | | |
| 8,141,240 | B2 | 3/2012 | Hiew et al. | | |
| 8,203,095 | B2 * | 6/2012 | Storm | C23C 8/24 | 148/206 |
| 8,204,618 | B2 | 6/2012 | Young, Jr. et al. | | |
| 8,242,907 | B2 | 8/2012 | Butler et al. | | |
| 8,263,896 | B2 | 9/2012 | Schneider | | |
| 8,272,794 | B2 | 9/2012 | Silchenstedt et al. | | |
| 8,278,588 | B2 | 10/2012 | Salsich et al. | | |
| 8,316,742 | B2 * | 11/2012 | Craig | B23B 51/00 | 82/1.11 |
| 8,373,084 | B2 | 2/2013 | Salsich | | |
| 8,376,671 | B2 * | 2/2013 | Kaneko | B23Q 3/15546 | 279/126 |
| 8,395,076 | B2 | 3/2013 | Matus | | |
| 8,431,862 | B2 * | 4/2013 | Kachline | B23K 9/1056 | 219/130.01 |
| 8,620,738 | B2 | 12/2013 | Fordyce, III et al. | | |
| 8,658,941 | B2 | 2/2014 | Albrecht | | |
| 8,686,318 | B2 * | 4/2014 | Albrecht | B23K 9/10 | 219/130.01 |
| 8,748,776 | B2 | 6/2014 | Albrecht et al. | | |
| 8,759,715 | B2 * | 6/2014 | Narayanan | B23K 9/092 | 219/130.51 |
| 8,766,132 | B2 | 7/2014 | Blankenship et al. | | |
| 8,859,828 | B2 | 10/2014 | Liu et al. | | |
| 8,859,928 | B2 | 10/2014 | Sommerfeld | | |
| 9,031,683 | B2 * | 5/2015 | Elfstrom | G06Q 10/06 | 700/116 |
| 9,129,330 | B2 | 9/2015 | Albrecht et al. | | |
| 9,737,954 | B2 * | 8/2017 | Hoffa | B23K 10/006 | |
| 2002/0117484 | A1 | 8/2002 | Jones et al. | | |
| 2003/0025598 | A1 | 2/2003 | Wolf et al. | | |
| 2003/0094487 | A1 * | 5/2003 | Blankenship | B23K 9/1062 | 235/375 |
| 2003/0148709 | A1 | 8/2003 | Anand et al. | | |
| 2004/0004064 | A1 | 1/2004 | Lanouette et al. | | |
| 2004/0031776 | A1 | 2/2004 | Gevelber et al. | | |
| 2004/0106101 | A1 | 6/2004 | Evans | | |

(56) References Cited

U.S. PATENT DOCUMENTS

2004/0193307 A1 9/2004 Fujishima et al.
2005/0045599 A1 3/2005 Matus
2005/0109738 A1 5/2005 Hewett et al.
2005/0145688 A1* 7/2005 Milenkovic ........ G08B 21/0261 235/375
2005/0173390 A1 8/2005 Lanouette et al.
2006/0006154 A1* 1/2006 Koike ...................... H05H 1/34 219/121.5
2006/0070986 A1 4/2006 Ihde et al.
2006/0163216 A1 7/2006 Brandt et al.
2006/0163228 A1* 7/2006 Daniel ................. B23K 9/0956 219/130.01
2006/0163230 A1 7/2006 Kaufman
2006/0201923 A1 9/2006 Hutchison
2006/0289406 A1* 12/2006 Helenius .................. H05H 1/28 219/121.48
2007/0012099 A1 1/2007 Becourt
2007/0051711 A1* 3/2007 Kachline .............. B23K 9/1056 219/130.01
2007/0080149 A1 4/2007 Albrecht et al.
2007/0080151 A1 4/2007 Albrecht et al.
2007/0080152 A1 4/2007 Albrecht et al.
2007/0080153 A1 4/2007 Albrecht et al.
2007/0210034 A1 9/2007 Mather et al.
2007/0294608 A1 12/2007 Winterhalter et al.
2008/0001752 A1* 1/2008 Bruns .................... G06Q 10/08 340/572.1
2008/0011821 A1 1/2008 Ellender et al.
2008/0023451 A1* 1/2008 Salsich ................ B23K 10/006 219/121.48
2008/0061049 A1* 3/2008 Albrecht .............. B23K 9/0953 219/137 R
2008/0066596 A1* 3/2008 Yamaguchi ............ B23K 7/002 83/34
2008/0083711 A1 4/2008 Twarog et al.
2008/0093476 A1 4/2008 Johnson et al.
2008/0149608 A1* 6/2008 Albrecht ................ B23K 9/123 219/130.1
2008/0149686 A1 6/2008 Daniel et al.
2008/0156783 A1 7/2008 Vanden Heuvel et al.
2008/0223952 A1 9/2008 Wernli et al.
2008/0257874 A1* 10/2008 Kaufman ............... B23K 9/124 219/137 R
2008/0308641 A1 12/2008 Finn
2009/0008370 A1 1/2009 Salsich et al.
2009/0057286 A1* 3/2009 Ihara .................... B23K 9/0953 219/130.21
2009/0065489 A1 3/2009 Duffy
2009/0107960 A1 4/2009 Hampton
2009/0152255 A1* 6/2009 Ma ......................... B23K 9/295 219/137.61
2009/0159572 A1 6/2009 Salsich
2009/0159575 A1 6/2009 Salsich
2009/0163130 A1 6/2009 Zambergs
2009/0184098 A1 7/2009 Daniel et al.
2009/0212027 A1 8/2009 Borowy et al.
2009/0219136 A1 9/2009 Brunet et al.
2009/0222804 A1* 9/2009 Kaufman ............. B23K 9/0953 717/168
2009/0230097 A1* 9/2009 Liebold .................... H05H 1/34 219/121.49
2009/0240368 A1 9/2009 Young, Jr. et al.
2009/0288532 A1 11/2009 Hashish
2010/0078408 A1 4/2010 Liebold et al.
2010/0084381 A1 4/2010 Indraczek et al.
2010/0155377 A1 6/2010 Lindsay et al.
2010/0324868 A1 12/2010 Russell et al.
2011/0000893 A1 1/2011 Blankenship et al.
2011/0029385 A1 2/2011 Engel et al.
2011/0114616 A1 5/2011 Albrecht
2011/0163857 A1 7/2011 August et al.
2011/0220630 A1* 9/2011 Speilman ............. B23K 9/1336 219/137 R
2011/0294401 A1 12/2011 Habermann et al.
2012/0021676 A1 1/2012 Schubert et al.
2012/0138583 A1 6/2012 Winn et al.
2012/0139692 A1 6/2012 Neubauer et al.
2012/0234803 A1* 9/2012 Liu ...................... B23K 10/006 219/121.54
2012/0241428 A1 9/2012 Kowaleski
2012/0247293 A1 10/2012 Nagai et al.
2013/0001221 A1* 1/2013 Lambert .............. H05B 6/6441 219/710
2013/0068732 A1 3/2013 Watson et al.
2013/0087537 A1 4/2013 Barnett et al.
2013/0179241 A1 7/2013 Liu
2013/0210319 A1 8/2013 Gramling et al.
2013/0253728 A1 9/2013 Stumpfl et al.
2013/0263420 A1 10/2013 Shipulski
2013/0264317 A1 10/2013 Hoffa et al.
2013/0264320 A1 10/2013 Shipulski et al.
2014/0069895 A1* 3/2014 Brine ..................... B23K 10/00 219/121.44
2014/0335761 A1 11/2014 Chou et al.
2015/0108223 A1* 4/2015 Weitzhandler ......... B60K 15/04 235/492
2015/0332071 A1 11/2015 Hoffa et al.
2015/0371129 A1 12/2015 Hoffa et al.
2016/0221108 A1 8/2016 Hoffa et al.
2017/0042011 A1 2/2017 Sanders et al.
2017/0042012 A1* 2/2017 Sanders ........... G06K 19/07773
2017/0046544 A1 2/2017 Ikemoto

FOREIGN PATENT DOCUMENTS

EP 1065620 1/2001
EP 1117279 7/2001
EP 1288016 3/2003
EP 1516688 3/2005
EP 1522371 4/2005
JP 61-063368 4/1986
JP S61-63368 4/1986
JP H05154732 A 6/1993
JP H11285831 A 10/1999
JP 2003025176 A 1/2003
JP 2003048134 A 2/2003
JP 2009252085 A 10/2009
JP 2012048287 A 3/2012
JP 2012079221 A 4/2012
WO 2008/144785 A1 12/2008
WO 2010/142858 A1 12/2010
WO 2013000700 A1 1/2013
WO 2013/151602 10/2013
WO 2013/151886 10/2013

OTHER PUBLICATIONS

International Search Report for International Application No. PCT/US2013/021364 dated Jan. 14, 2013 4 pages.
International Search Report for International Application No. PCT/US2013/034572 dated Mar. 29, 2013 4 pages.
U.S. Appl. No. 13/439,259, Shipulski et al., filed Apr. 4, 2012.
U.S. Appl. No. 13/560,059, Shipulski, filed Jul. 27, 2012.
U.S. Appl. No. 14/075,692, Lindsay et al., filed Nov. 8, 2013.
U.S. Appl. No. 14/135,714, Lindsay et al., filed Dec. 20, 2013.
U.S. Appl. No. 14/589,270, Brandt et al., filed Jan. 5, 2015.
U.S. Appl. No. 14/807,589, Hoffa et al., filed Jul. 23, 2015.
U.S. Appl. No. 14/807,679, Hoffa et al., filed Jul. 23, 2015.
U.S. Appl. No. 13/949,364, Brine et al., filed Jul. 24, 2013.
U.S. Appl. No. 14/053,078, Adams et al., filed Oct. 14, 2013.
U.S. Appl. No. 14/079,163, Brine et al., filed Nov. 13, 2013.
U.S. Appl. No. 14/486,569, Mao et al., filed Sep. 15, 2014.
U.S. Appl. No. 14/641,897, Vandergon et al., filed Mar. 9, 2015.
Examination Report for corresponding Australian Patent Application No. 2013243978, dated Nov. 17, 2015, 4 pages.

* cited by examiner 1200
1201
1202a
1202b
1202c
1202d
1202e
1202f
1202g
1204a
1204b
1205
1210
1215
1217
1220
1225

SYSTEMS, METHODS, AND DEVICES FOR TRANSMITTING INFORMATION TO THERMAL PROCESSING SYSTEMS

CROSS REFERENCE TO RELATED APPLICATIONS

This application is a continuation-in-part of U.S. Ser. No. 13/560,059, filed Jul. 27, 2012 and titled "Optimization and Control of Material Processing Using a Thermal Processing Torch," which is a continuation-in-part of U.S. Ser. No. 13/439,259, filed Apr. 4, 2012 and titled "Optimization and Control of Material Processing Using a Thermal Processing Torch," the contents of both of these applications are hereby incorporated herein by reference in their entirety.

TECHNICAL FIELD

This disclosure relates generally to thermal processing systems and more particularly to systems, methods, and devices for transmitting information to thermal processing systems.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

Typically, a plasma arc torch includes multiple consumables. Each consumable can be selected to achieve optimal performance (e.g., an optimal current level, maximum lifespan, etc.) in view of specific processing constraints, such as the type of material being cut and/or the cut shape desired. Installing incorrect consumables into a torch can result in poor cut quality and decreased cut speed. In addition, incorrect consumables can reduce consumable life and lead to premature consumable failure. Even when correct consumables are installed in a torch, it can be difficult for an operator to manually configure and optimize torch operating parameters corresponding to the selected consumable set. Moreover, it can be difficult for a torch component manufacturer to guarantee performance if aftermarket consumables are used in a torch system.

SUMMARY

Thus, systems and methods are needed to detect consumables installed in a plasma arc torch (e.g., detect incompatible consumables installed in a plasma arc torch). In addition, systems and methods are needed to automatically adjust torch operating parameters to enhance cutting quality and prolong consumable life. Specifically, systems and methods are needed to efficiently convey information among various components of a torch system to facilitate operation control and optimization.

In addition to signal devices (e.g., data storage devices) arranged on the consumables to identify the consumables installed in the plasma arc torch, signal devices arranged in or on the consumables, as discussed below, can also be used to transfer information (e.g., information relating to torch system operation (e.g., operating data/parameters)) to the torch system by communicating with a receiver (e.g., a data reading device (e.g., an RFID reading device)) disposed in the torch.

In some aspects, a replaceable consumable component for performing a cutting or welding operation can includes a body; and a readable data storage device coupled to the body or integrated within the body, wherein the data storage device contains an operation instruction for a cutting or welding device.

In some aspects, a torch for a cutting or welding process coupled to a controller of a thermal processing system can include a replaceable consumable component; a readable data storage device located in or on the replaceable consumable component; a data reading device in or on the torch for reading the data storage device; and a data transfer mechanism enabling communication between the data reading device and the controller, wherein the data storage device contains data for the operation of the thermal processing system.

In some aspects, a torch for a cutting or welding process, coupled to a controller, can include a receptacle within the torch, the torch being configured to receive a replacement consumable component; a data reading device in or on the torch; and a data transfer mechanism providing communication capabilities between the torch and the controller.

In some aspects, a method for at least partially controlling a process of a cutting or welding system can include providing a consumable having a data tag containing operating parameters (e.g., which can include a cutting program); assembling the consumable into a tool of the cutting or welding system; communicating the operating parameters to a control device of the tool; and controlling the cutting or welding process in accordance with operating parameters.

Embodiments can include one or more of the following features.

In some embodiments, the operation instruction comprises a cutting program. For example, the cutting program can include a current or gas ramping profile, torch system setup values, a workpiece cutting application.

In some embodiments, the operation instruction includes a firmware update.

In some embodiments, the replaceable consumable component comprises a component of a thermal processing torch. For example, the consumable component can include a nozzle, a shield, or an electrode.

In some embodiments, the readable data storage device includes an RFID tag. In some embodiments, the readable data storage device is also rewritable. In some cases, the data transfer mechanism comprises a wireless connection. In some cases, the readable data storage device is rewriteable.

In some embodiments, the readable data storage device is writable while in service and/or while disposed within the torch.

In some embodiments, the data includes a cutting program. In some embodiments, the data is configured to produce an altered performance characteristic of the thermal processing system. For example, the altered performance characteristic can include a better cut quality capability relative to an original cutting capability that would be possible using a substantially similar replaceable consumable component that does not transfer the data. The data can also include a firmware update for the thermal processing system.

In some embodiments, the data reading device can include an RFID reading device. In some cases, the data reading device is configured to communicate with a data storage device in or on a consumable component disposed in the torch. In some cases, the data reading device is also a data writing device configured to write data to the data storage device.

In some aspects, a method for providing operating data to a cutting or welding system using a replaceable consumable component comprising a readable data storage device can include facilitating communication between the readable data storage device and a data reading device of the cutting or welding system; and transferring operating data at least partially defining the operating parameter from the readable data storage device to the data reading device, the operating data being configured to affect an operation of the cutting or welding system.

In some embodiments, the readable data storage device comprises a first readable data storage device of a first replaceable consumable component and the data reading device comprises at least one data reading device of the cutting or welding system; and the operating data comprises a first set of operating data from the first readable data storage device, further comprising: facilitating communication between a second readable data storage device of a second replaceable consumable component and one of the at least one data reading devices of the cutting or welding system; and transferring a second set of operating data from the second readable data storage device to one of the at least one data reading devices, the second set of operating data being configured to adjust the operation of the cutting or welding system. In some cases, the first replaceable consumable component includes an electrode component and the second replaceable consumable component includes a nozzle component. In some cases, a combination of the first set of operating data and second set of operating data are required to fully operate the cutting or welding system.

In some embodiments, the replaceable consumable component is a first consumable component and the cutting or welding system is further configured to identify a second consumable component based on physical features of the second consumable component. For example, identifying the second consumable component based on physical features of the second consumable component can include measuring a gas flow through the second consumable component. In some cases, the measuring the gas flow can include: directing a gas flow through a flow-restriction element associated with the second consumable component disposed within the cutting or welding system; determining a first pressure of the gas flow at a location upstream relative to the flow-restriction element; determining a second pressure of the gas flow at a location downstream from the flow-restriction element; determining a flow rate of the gas flow passing through the flow-restriction element; and using the first pressure, the second pressure, and the flow rate to identify the second consumable component. For example, in some cases, determining the first pressure can include setting the gas flow to a known pressure; and determining a flow rate can include measuring the flow rate.

In some embodiments, the operating data includes a firmware update for the cutting or welding system. In some cases, the method also includes determining a firmware version being used by the cutting or welding system; and comparing the firmware version being used with a firmware version of the firmware update. In some cases, the firmware update can include a date code that is used to determine if the firmware update should be transferred to the cutting or welding system. In some cases, affect includes fully replacing the control software.

In some aspects, a method for storing information on a replaceable consumable component used in a thermal processing machine while the replaceable consumable component is in an operation configuration can include configuring a rewritable data storage device of the replaceable consumable component for communication with a data writing device of the thermal processing machine; and writing the information by the data writing device to the rewritable data storage device.

In some embodiments, the information can be associated with a previous use (e.g., a cutting or welding operation) of the replaceable consumable component. For example, the information can include information relating to a time duration of the previous use of the replaceable consumable component. The information can include information relating to a failure or error of a torch, the replaceable consumable component, or the thermal processing machine. The information can be rewritten while the consumable is operationally installed within the thermal processing machine. The information can be repeatedly rewritten while in operation. The information can include information relating to a frequency of use of the thermal processing machine. The information can include information relating to a number of cutting cycles for which the replaceable consumable component has been used. The information can include information relating to operating parameters of the thermal processing machine during the previous use of the replaceable consumable component.

In some embodiments, the operation configuration can include the thermal processing machine being in use.

The operating instructions/program can include: (e.g., cutting program, current or gas ramping profile, firmware updates, set up values of the system, cut cycle or life data, gas flow rates, gas types, pierce delay time, timing parameter, set points, error conditions, thresholds, coordination of multiple parameters).

In some embodiments, as a result of transferring the information (e.g., operating data, instructions, or programs) from the readable storage device to the data reading device, an operator of the thermal processing machine is not required to manually input as many operating parameters that would be required if the operating data was not transferred.

The replaceable consumable can include a component of a thermal processing torch (e.g., a nozzle, shield, or electrode). The data reading device can be an RFID reading device. The operating data can include a workpiece cutting application (e.g., a killer app.).

The operating data can be configured to produce an altered performance characteristic of the thermal processing machine. The altered performance characteristic can include a faster cutting capability relative to an original cutting capability that would be possible using a substantially similar replaceable consumable component that does not transfer the operating data.

The signal device (e.g., tag) can be rewriteable (writable while in service and while in the torch).

In one aspect, a method is provided for configuring a first thermal processing system and a second thermal processing system. The method includes providing a first consumable for use in a first thermal processing torch and a second consumable for use in a second thermal processing torch.

The first consumable and the second consumable have substantially identical physical characteristics. The first consumable is associated with a first signal device encoded with first data and the second consumable is associated with a second signal device encoded with second data. The method includes mounting the first torch with the first consumable in the first thermal processing system and the second torch with the second consumable in the second thermal processing system. The method also includes sensing, by the first thermal processing system, the first data stored in the first signal device and sensing, by the second thermal processing system, the second data stored in the second signal device. The method further includes configuring, by the first thermal processing system, a parameter of the first thermal processing system for operating the first torch based on the sensed first data by assigning a first value to the parameter. In addition, the method includes configuring, by the second thermal processing system, the parameter of the second thermal processing system for operating the second torch based on the sensed second data by assigning a second value to the parameter. The second value can be different from the first value.

In another aspect, a method is provided for assembling a first thermal processing torch and a second thermal processing torch. The method includes providing a first consumable with a first signal device located on or within a body of the first consumable and providing a second consumable with a second signal device located on or within a body of the second consumable. The method includes encoding the first signal device with first data associated with the first consumable. The first data correlates to a first value of a parameter of a first thermal processing system for operating the first torch. The method further includes encoding the second signal device with second data associated with the second consumable. The second data correlates to a second value of the parameter of a second thermal processing system for operating the second torch. The second value can be different from the first value.

In other examples, any of the aspects above can include one or more of the following features. In some embodiments, at least one of the first or second data is independent of a detectable physical characteristic of the corresponding first or second consumable. At least one of the first or second data can identify a type of the corresponding first or second consumable. The type of the corresponding consumable can include a nozzle, a shield, an electrode, an inner retaining cap, an outer retaining cap, a swirl ring or a welding tip. In addition, at least one of the first or second data can identify a serial number unique to the corresponding first or second consumable. At least one of the first or second data can transmitted to the corresponding first or second thermal processing system as a pneumatic signal, a radio signal, a light signal, a magnetic signal or a hydraulic signal.

In some embodiments, at least one of the first signal device or the second signal device comprises a radio-frequency identification (RFID) tag. At least one of the first signal device or the second signal device can be located on or within a body of the corresponding first or second consumable. In some embodiments, the first or second signal device is located at a surface of the body of the corresponding first or second consumable to minimize heat exposure during torch operation. The surface can be adjacent to a cooling mechanism, remote from a plasma arc, or in an o-ring channel of the corresponding first or second consumable, or a combination thereof.

In some embodiments, the parameter includes a torch height above a workpiece, a flow rate of a plasma gas, a flow rate of a shield gas, a timing of plasma gas or current, or a process program for cutting the workpiece. In some embodiments, the parameter is included in a set of parameters configurable by at least one of the first or second thermal processing system to operate at least one of the first torch or second torch. In such a case, the first and second thermal processing systems can assign a value to each of the set of parameters for operating the respective first and second torches.

In some embodiments, the method further includes providing a first workpiece and a second workpiece for processing by the first torch and the second torch, respectively. The first and second workpieces are at least substantially the same.

In some embodiments, sensing the first data stored in the first signal device further includes using a signal detector of the first thermal processing system to sense the first data. The signal detector can be an RFID reader. The signal detector can be located external to the first torch.

In some embodiments, the first and second thermal processing systems are the same thermal processing system.

In another aspect, a method is provided for configuring a thermal processing system. The method includes providing a consumable for use in a thermal processing torch. The consumable has one or more physical characteristics that facilitate installation into the torch. The method includes mounting the consumable in the torch, connecting the torch to the thermal processing system and sensing, by the thermal processing system, data associated with the consumable. The method further includes configuring, by the thermal processing system, one or more parameters of the thermal processing system for operating the torch based on whether the sensed data satisfies a criterion.

In some embodiments, configuring one or more parameters of the thermal processing system includes preventing the thermal processing system from operating the torch if the data does not satisfy the criterion. The data can identify a manufacturer of the consumable that does not match a permitted manufacturer.

In some embodiments, the data is encoded in a signal device coupled to the consumable. Sensing can be performed by an RFID reader of the thermal processing system.

In some embodiments, the method further includes preventing configuration of one or more parameters of the thermal processing system in the absence of any data sensed by the thermal processing system.

In some aspects, some embodiments may have one or more of the following advantages. Using the systems and methods described herein that include using thermal processing system consumable components (e.g., plasma torch nozzles, shields, retaining caps, or other consumables) having data storage devices (e.g., readable or rewritable data storage devices) disposed in or on the consumable components can result in a thermal processing system (e.g., a cutting or welding system) that is easier to set up, use, and/or troubleshoot. For example, as discussed herein, data storage devices arranged in or on a consumable component can be used to provide information (e.g., operating parameters) to the thermal processing system on which the consumable component is used. In some cases, the information can be transmitted to the thermal processing system at least semi-automatically (e.g., automatically) upon assembly of the consumable component into a device of the system (e.g., a torch). As a result of the information being transmitted to the system, some or all of the operating parameters or instructions needed in order to operate the machine do not need to be input (e.g., programmed) into the system by an operator using the thermal processing system. Requiring less input from an operator can result in a processing system that is easier and less expensive to operate.

In some embodiments, using the systems and methods described herein can enable a thermal processing system to semi-automatically (or automatically) review and update system software (e.g., firmware) by transmitting software from the data storage device to the processing system when the consumable is installed in a device of the processing system (e.g., the torch). As a result of semi-automated software update capabilities, the systems and methods described herein typically require less maintenance (e.g., operator-initiated maintenance) and downtime, which could otherwise be needed to test the thermal processing system and update the software.

Additionally, using the systems and methods described herein to transmit thermal processing system setup information or operating parameters can enable customized cutting or welding properties being used for a particular consumable component. For example, as discussed below, two different structurally similar consumable components can each have a data storage device, where one of the data storage devices includes operating parameters that are better-suited to fast, rough cutting processes and the other data storage device includes operating parameters that are better-suited for slow cutting processes that produce higher quality cuts. That is, consumable components can be "pre-loaded" with information (e.g., operating parameters) that make the consumable preferred for any of various types of cutting performance characteristics. As a result of tailoring the data storage device for a particular use of the respective consumable, a consumer (e.g., machine operator) can merely choose a consumable according to the desired type of cutting or welding to be performed and install the consumable into the processing system (e.g., into the torch). Therefore, the processing system need not be fully set up and programmed by the operator, rather the processing system can be automatically set up upon installation of the consumable into the torch (e.g., when information is transmitted from the data storage device to the torch).

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

DETAILED DESCRIPTION

In some aspects, thermal processing systems having a receiver (e.g., a data reading and/or data writing device) that communicates with a signal device (e.g., a data storage device or data tag) disposed in or on a consumable component arranged within the torch can be used to transmit information (e.g., operating instructions or information about the torch use) between a controller (e.g., processor) of the system and the consumable installed within the torch.

Figure 1:
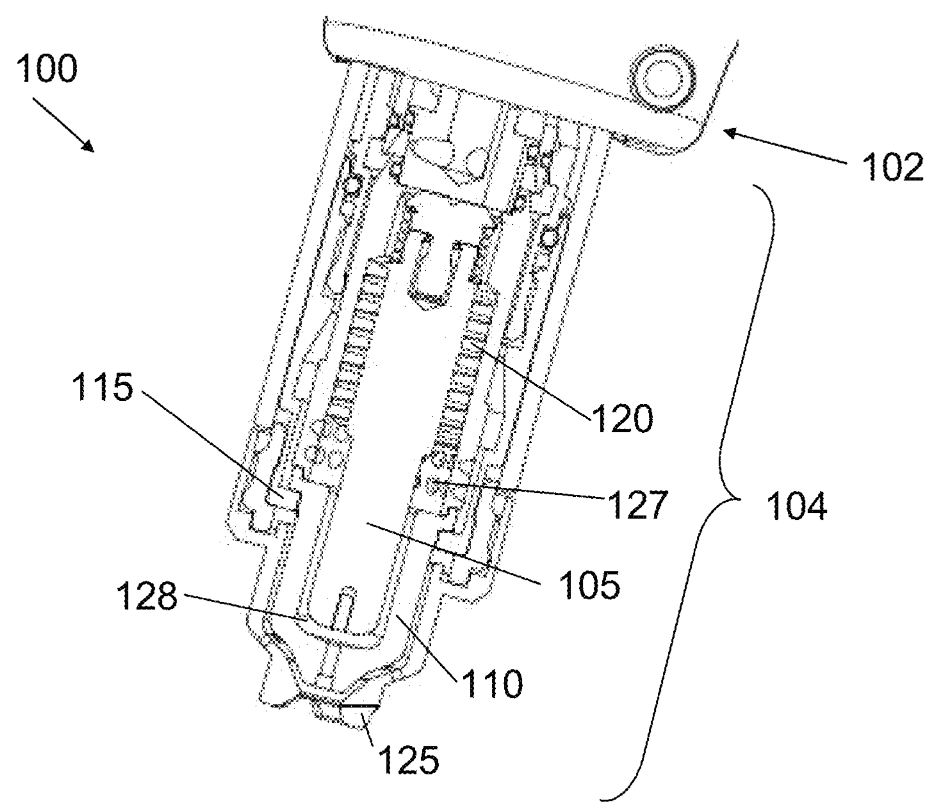
FIG. 1 is a cross-sectional view of an exemplary plasma arc torch.

FIG. 1 is a cross-sectional view of an exemplary plasma arc torch 100 of a thermal processing system (e.g., a cutting or welding system). The torch 100 typically includes a torch body 102 and a torch tip 104. The torch tip 104 includes one or more consumables (e.g., replaceable consumable components (e.g., an electrode 105, a nozzle 110, a retaining cap 115, a swirl ring 120, and a shield 125)) disposed within a receptacle (e.g., a consumable receptacle) that is configured to receive a replacement consumable. Each of the various consumables include a body that defines various features that, as discussed herein, can direct fluids (e.g., gas or liquids) during operation of the torch 100. The torch body 102, which has a generally cylindrical shape, supports the electrode 105 and the nozzle 110. The nozzle 110 is spaced from the electrode 105 and has a central exit orifice mounted within the torch body 102. The swirl ring 120 is mounted to the torch body 102 and has a set of radially offset or canted gas distribution holes 127 that impart a tangential velocity component to the plasma gas flow, causing the plasma gas flow to swirl. The shield 125, which also includes an exit orifice, is connected (e.g., threaded) to the retaining cap 115. The retaining cap 115 as shown is an inner retaining cap securely connected (e.g., threaded) to the nozzle 110. In some embodiments, an outer retaining cap (not shown) is secured relative to the shield 125. The torch 100 can additionally include electrical connections, passages for cooling, passages for arc control fluids (e.g., plasma gas), and a power supply. In some embodiments, the consumables include a welding tip, which is a nozzle for passing an ignited welding gas.

In operation, plasma gas flows through a gas inlet tube (not shown) and the gas distribution holes 127 in the swirl ring 120. From there, the plasma gas flows into a plasma chamber 128 and out of the torch 100 through the exit orifice of the nozzle 110 and the shield 125. A pilot arc is first generated between the electrode 105 and the nozzle 110. The pilot arc ionizes the gas passing through the nozzle exit orifice and the shield exit orifice. The arc then transfers from the nozzle 110 to a workpiece (not shown) for thermally processing (e.g., cutting or welding) the workpiece. It is noted that the illustrated details of the torch 100, including the arrangement of the components, the direction of gas and cooling fluid flows, and the electrical connections, can take a variety of forms.

Different operating processes often require different shield and/or plasma gas flow rates, which require different sets of consumables. This leads to a variety of consumables being used in the field. Using the correct consumables and matching them appropriately is necessary to achieve optimal cutting performance. Consumable mismatch (e.g., using a consumable made for operation at 65 Amps in a torch that is being operated at 105 Amps) can result in poor consumable life and/or poor performance of the plasma arc torch.

Figure 2:
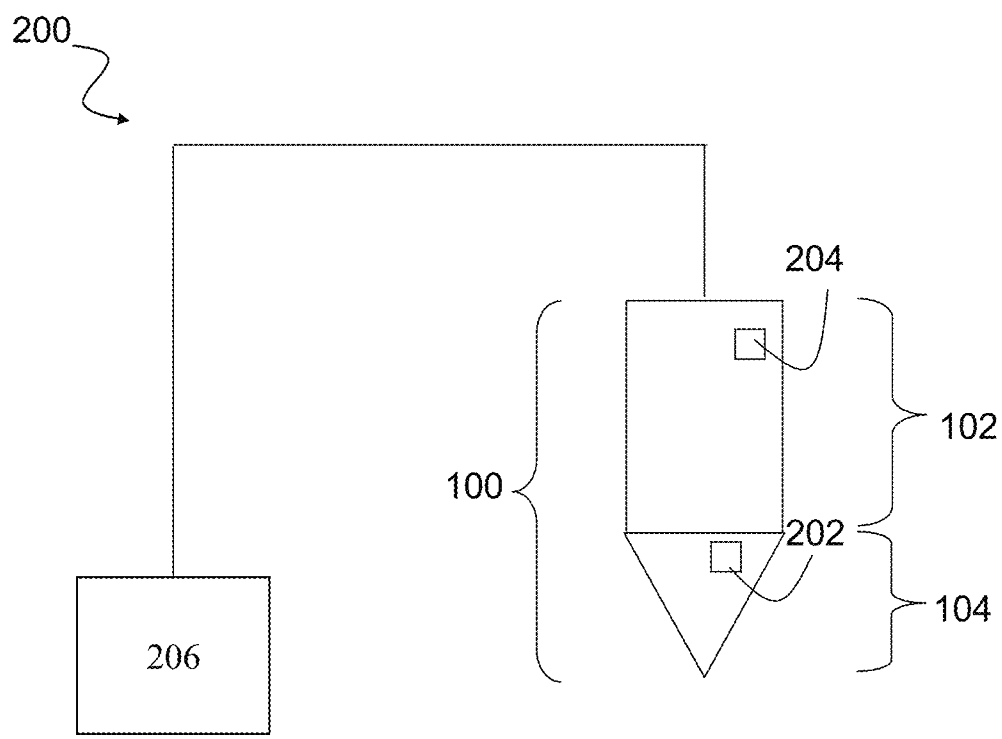
FIG. 2 is a schematic diagram of an exemplary communication network.

FIG. 2 shows an exemplary communication network 200 of the present invention. The communication network 200 includes one or more signal devices (e.g., a readable data storage device) 202, each assigned to a consumable of a thermal processing torch, such as the plasma arc torch 100 of FIG. 1. In some embodiments, the readable data storage device 202 is located on (e.g., coupled to) the body or located within (e.g., integrated within) the body. Exemplary consumables include the electrode 105, the nozzle 110, the retaining cap 115, the swirl ring 120, and the shield 125. In some embodiments, a signal device 202 is an electrically writable device configured to transmit information about a consumable in the form of one or more signals. For example, the signal device 202 can be a radio-frequency identification (RFID) tag or card, bar code label or tag, integrated circuit (IC) plate, or the like. In some embodiments, the readable data storage device 202 is rewritable. That is, a rewritable data storage device 202 is typically able to add new data after the initial writing of data (e.g., with or without deleting or overwriting other data present on the data storage device). In particular, the rewritable data storage device 202 is typically able to have new data written while disposed within the torch 100. In some embodiments, the readable storage device 202 is rewritable while outside of the torch (e.g., during service of the torch or the consumable) or disposed within a torch (e.g., during use of the torch). In some embodiments, a signal device 202 is a detector (e.g., a sensor) for detecting a physical characteristic of the consumable and transmitting the detected information in the form of one or more signals.

The communication network 200 also includes at least one receiver (e.g., a data reading device arranged in or on the torch) 204 for (i) receiving signals transmitted by the signal devices 202 (e.g., reading the data storage device 202), (ii) extracting data conveyed by the signals, and (iii) providing the extracted data to a processor 206 for analysis and further action. In some embodiments, the data reading device 204 is also a data writing device that is configured to write data to a rewritable storage device positioned within the torch. The processor (e.g., a controller) 206 can be a digital signal processor (DSP), microprocessor, microcontroller, computer, computer numeric controller (CNC) machine tool, programmable logic controller (PLC), application-specific integrated circuit (ASIC), or the like. In some embodiments, the torch 100 also includes a data transfer mechanism enabling communication between the data reading device 204 and the controller 206. For example, the data transfer mechanism can include a wired connection or a wireless connection that is configured to transmit data or signals received from signal device 202 to the controller 206. Alternatively or additionally, the data transfer mechanism can be configured to transmit data from the controller 206 back to a rewritable data storage device 202 disposed on a consumable via the data reading device 204.

In some embodiments, each signal device 202 is encoded with information pertaining to the consumable to which the signal device 202 is assigned. The encoded information can be generic or fixed information such as the consumable's name, trademark, manufacturer, serial number, and/or type. The encoded information, for example, can include a model number to generally indicate that the consumable is a nozzle. In some embodiments, the encoded information is unique to the consumable, such as metal composition of the consumable, weight of the consumable, date, time and/or location at which the consumable was manufactured, personnel responsible for the consumable, and the like. As an example, the encoded information can provide a serial number, which is unique to each torch component manufactured, to distinguish, for example, nozzle Type A, Serial #1 from nozzle Type A, Serial #2.

In some embodiments, information is encoded to a signal device 202 at the time of manufacture of the corresponding consumable. Information can also be encoded to a signal device 202 during the lifetime of the consumable, such as after each consumable use. Such information can include the date, time and location of consumable use, any abnormalities detected during use, and/or consumable conditions after use so that a log can be created to predict a failure event or end-of-life event associated with the consumable.

In some embodiments, the information encoded to a signal device 202 can also specify operating parameters (e.g., operation instructions or operating data). For example, for a signal device 202 associated with the shield 125, data encoded to the signal device 202 can indicate the type of shield gas and/or the appropriate gas flow rate for the shield 125. In some embodiments, encoded data of a signal device 202 provides information about other related torch components. For example, encoded data can identify other torch components that are compatible with the assigned consumable, assisting with installation of the entire consumable set in a torch to achieve certain performance metrics. In some embodiments, the operating parameters include one or more of various types of information or data that can be utilized by the thermal processing system 100 during use. Examples of operating parameters include a cutting program, an electrical current (e.g., ignition or cutting current) or gas (e.g., plasma or shield gas) ramping profile, set up values for the thermal processing system, cut cycle or life data of the torch of consumables, gas flow rates (e.g., ignition or cutting gas flow rates), gas types (e.g., gas selection instructions), pierce delay time, timing parameters, set points, error conditions, thresholds, or a coordination of multiple parameters. In some cases, the operating data includes a workpiece cutting application, such as "Killer App." For example, a "Killer App" can be configured to provide a desired operational performance characteristic, features, or cutting application.

In some embodiments, the information sent from the consumable component can include software information for the thermal processing system. For example, in some embodiments, the consumable can contain firmware updates for the thermal processing system. In some cases, the controller can determine the firmware version being used by the thermal processing system and compare it to a version of the firmware update contained on the readable data storage device in order to determine whether the firmware update residing on the readable data storage device is newer than that being used. By comparing the two firmware versions, the controller can determine whether or not the firmware update should be transmitted from the readable data storage device to the data reading device and subsequently installed onto the thermal processing system. For example, the firmware update residing on the readable data storage device can include an identifying code (e.g., a date code, a revision identifying (e.g., a revision number), or any of various other suitable identifying codes) which the data reading device can read and consider. In some cases, the information comprises full control software that can be sent to the data reading device and installed by the controller.

In some embodiments, the operating parameters sent to the torch are configured to produce an altered performance characteristic of the thermal processing system. For example, in some embodiments, the altered performance characteristic includes a faster cutting capability relative to an original cutting capability that would be possible using a substantially similar replaceable consumable component that does not transfer the operating parameters. That is, for example, two different substantially similar (e.g., structurally similar) nozzles can each include a data storage device having different cutting parameters so that one of the nozzles provides cutting parameters that are well-suited for fast cutting (i.e., fast movement of the plasma arc along a workpiece) and the other nozzle provides cutting parameters that are better suited for slow cutting and/or higher quality cut edges. That is, consumable components can be "pre-loaded" with information (e.g., operating parameters) that make the consumable preferred for any of various types of cutting performance characteristics. As a result of tailoring the data storage device for a particular use of the respective consumable, a consumer (e.g., machine operator) can merely choose a consumable according to the desired type of cutting or welding to be performed and install the consumable into the processing system (e.g., into the torch). Examples of preferred cutting characteristics include fast cutting, slow cutting, high quality cutting edges, reduced kerf, reduced workpiece splatter, straight line cutting, curved cutting, circle cutting, clockwise or counterclockwise cutting, or various other cutting characteristics.

Therefore, in some aspects, the processing system need not be fully set up and programmed by the operator, rather the processing system can be automatically set up upon installation of the consumables into the torch (e.g., when information is transmitted from the data storage device to the torch). For example, in some embodiments, an operator can install a consumable component (e.g., a nozzle) into a torch and a signal device (e.g., readable storage device (e.g., an RFID tag)) 202 in or on the nozzle can communicate with a receiver (e.g., a data reading device) 204 of the torch so that the machine setup information (e.g., the operating parameters) can be automatically programmed into the thermal processing system by the processor (e.g., controller) 206 for use. In some cases, as a result of transferring information (e.g., operating parameters, instructions, or programs) from the readable storage device to the data reading device, an operator of the thermal processing machine is not required to manually input as many operating parameters that would be required if the operating data was not transferred.

As discussed above, in some embodiments, the thermal processing system (e.g., data reading/writing device) is configured to transmit information (e.g., data) to the rewritable data storage device. In some cases, the thermal processing system is configured to periodically (e.g., repeatedly or continually) write data to the rewritable storage device while the consumable is disposed (e.g., operationally installed) within the torch (e.g., during use of the torch). The information transmitted to the rewritable storage device can be associated with the thermal processing system, the torch in which the consumable is installed, or a previous use (e.g., a cutting or welding operation) of the replaceable consumable component in or on which the rewritable storage device in installed. For example, the information can include information relating to the frequency of use (e.g., how many cutting or welding operations for which the replaceable consumable component has been used over a given time), relating to a number (e.g., a total number) of cutting cycles for which the replaceable consumable component has been used, or relating to a time duration of the previous use of the replaceable consumable component (i.e., how long the torch was in operation during the previous use).

In some embodiments, the information can relate to the operating parameters of the thermal processing machine during the previous use of the replaceable consumable component. In some cases, the information relates to a failure or error of the torch, consumable, or thermal processing system during the previous use.

In some embodiments, the signal device 202 and/or the receiver 204 are encrypted in order to limit (e.g., prevent) a third party from interfering (e.g., fraudulently interfering) or altering data stored on the signal device 202. For example, encryption can help to limit a third party from fraudulently storing incorrect usage data or set up information (e.g., operating parameters) onto a consumable, which could cause a thermal processing system to mistake or misinterpret a used (e.g., used to the end life) consumable as an usable consumable. Alternatively or additionally, encryption can be used in order to code consumables for use with only one type (e.g., manufacturer or OEM brand) or thermal processing system.

In some embodiments, a signal device 202 includes information about the corresponding consumable independent of a detectable physical characteristic of the consumable. Examples of detectable physical characteristics of the consumable include magnetic properties, surface reflectivity, density, acoustic properties and other tactile features of the consumable measured by a detector installed in the torch. Therefore, examples of consumable data independent of a detectable physical characteristic of the consumable can include consumable name, type, manufacturer, manufacturing date, manufacturing location, serial number, or other non-tactile features of a consumable. In some embodiments, the signal device 202 stores pre-collected information of the consumable, including physical characteristics, before it is installed into the torch, but the signal device 202 is not configured to actively measure or detect the physical characteristics. However, the signal device 202 can store physical characteristics about the consumable measured or detected by another device, such as by a sensor.

In some embodiments, the signal device 202 is located inside or on the torch 100. For example, the signal device 202 can be attached to a surface of a consumable that is ultimately installed inside of the torch tip 104. The signal device 202 can also be attached to a component inside of the torch 100 other than the assigned consumable. For example, while a signal device 202 is assigned to store data about the electrode 105, the signal device 202 can be affixed to a surface of the retaining cap 115. In some embodiments, the signal device 202 is coupled to an external source that is not physically associated with the torch 100. For example, the signal device 202 can be attached to a package used to store the consumable and is remote from the consumable once it is installed in the torch 100. If a signal device 202 is located inside of the torch 100, the surface to which the signal device 202 is attached can be selected to reduce or otherwise minimize heat exposure during operation of the torch 100. For example, the signal device 202 can be located near a cooling mechanism, away from the plasma arc, and/or in an o-ring channel of the torch 100 to reduce or minimize heat exposure. In addition, the signal device 202 can be coated with a heat protective material to reduce the likelihood that the device will overheat during torch operation. Generally, the signal device 202 can be situated, such as being shielded by another torch component, to minimize exposure to thermal energy, radiation, damaging gases (e.g., ozone), and/or high-frequency energy.

In some embodiments, a signal device 202 is designed to be durable, i.e., functional during and after one or more torch ignitions. In some embodiments, a signal device 202 is disposable after each torch use or after several uses. In some embodiments, a signal device 202 is writable once, for example, to encode information about a consumable when the consumable is first manufactured. In some embodiments, a signal device 202 is writable multiple times, such as throughout the lifespan of the corresponding consumable.

In the communication network 200, the signal device 202 can wirelessly transmit its stored information to the receiver 204 in the form of one or more signals. The receiver 204 is adapted to process these signals to extract pertinent data about the consumable and forward the data to the processor 206 for analysis. In some embodiments, the receiver 204 is located in or on the plasma arc torch 100. For example, the receiver 204 can be located in the torch body 102. In some embodiments, the receiver 204 is at a location external to the torch 100, such as attached to a power supply module, a gas console, the processor 206, etc.

In some embodiments, at least one of the signal devices 202 is an RFID tag and the receiver 204 is a reader used to interrogate the RFID tag. In such embodiments, the RFID tag includes a microchip for storing information and an antenna for receiving and transmitting RF signals. The reader can include (1) an antenna for transmitting RF signals to the RFID tag to interrogate the tag and (2) components for decoding a response transmitted by the RFID tag before forwarding the response to the processor 206. The RFID tag can be either active or passive. An active RFID tag includes a battery to produce a stronger electromagnetic return signal to the reader, thereby increasing the possible transmission distance between the RFID tag and the reader. The distance between an RFID tag and a reader can be from less than one inch to 100 feet or more, depending on the power output, the radio frequency used and the type of material through which the RF signals need to travel. In one example, the distance between an RFID tag and an antenna of a corresponding reader can be about 2-4 cm. A reader antenna and remaining reader components do not need be in the same packaging. For example, the reader antenna can be located on or inside of the torch body 102 while the remaining reader components are external to the torch 100. Using an RFID tag is advantageous because it does not require direct contact (e.g., via wires) or direct line of sight (e.g., via optical signals) with the reader and is well suited for use in harsh environments.

Figure 3:
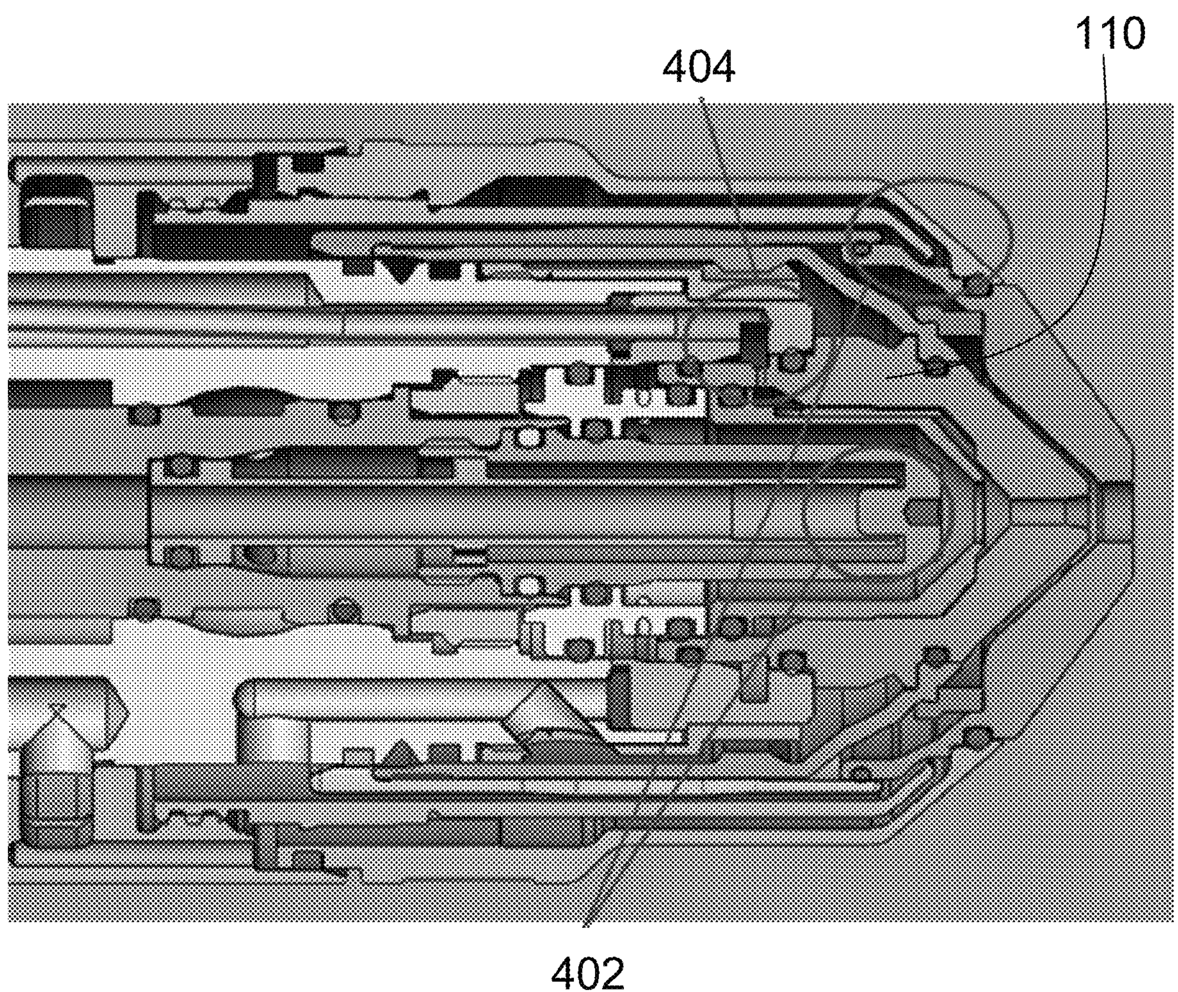
FIG. 3 is a cross-sectional view of an exemplary plasma arc torch illustrating an altered geometry of various consumable components of the plasma arc torch.

In some embodiments, a signal device 202 is a detector (e.g., a sensor) for detecting at least one physical marker of the consumable for uniquely identifying the consumable by its type or individually. The physical marker can be a physical alteration of the consumable, for example. As shown in FIG. 3, identification of a consumable is achieved by altering the geometry of the consumable such that, when it is installed in the torch 100, it affects the wall of an adjacent coolant passageway 402, which in turn alters the rate of a coolant flowing therethrough. Specifically, the altered section of the coolant passageway 402 can restrict the rate of the coolant flow. A signal device 202 can be used to measure the pressure change as a function of the coolant flow rate. Hence, the measured coolant pressure change serves as an identification of the consumable. In another example as shown in FIG. 3, an auxiliary vent line 404 that is connected to a valve and a flow meter is attached to the nozzle 110 to identify the nozzle 110. The valve is opened prior to plasma arc ignition and the auxiliary vent line flow rate is measured by a signal device 202 as a function of plasma pressure during a purge cycle. Therefore, the measured flow rate serves as an identification of the nozzle 110. In another example, one or more uniquely sized metering holes (not shown) can be drilled into the outer retain cap to identify the cap once it is installed in the torch 100. The size of each metering hole is configured to uniquely affect the off-valve pressure and/or the flow rate of the shield gas. Therefore, these measurements, taken by a signal device 202 in a pre-flow routine prior to pilot arc ignition, serve to identify the outer retaining cap.

In yet another example, the shield 125 can be identified by measuring the consumable's length relative to a reference torch datum. In an exemplary measurement process, a torch height controller is used to determine the height at which a known torch fires and begins to cut a workpiece. This height can serve as the reference torch datum. Then, after installing an unidentified consumable into the torch, the height relative to the reference datum is determined. Therefore, simple calculations involving the two heights can be used to determine the relative length of the unidentified consumable. In turn, the relative consumable length can be used to identify the consumable by, for example, referencing a looking-up table that correlates relative consumable lengths to consumable parts.

In some embodiments, a signal device 202 is a barcode that provides optical machine-representation of data about the corresponding consumable. A barcode can be read by the receiver 204 in the form of a barcode reader. Generally, a signal device 202 can convey data about a consumable in the form of any machine readable signals, including radio signals, optical or other light-based signals (e.g., infrared signals or ultraviolet signals), magnetic signals, pneumatic signals, or hydraulic signals.

In some embodiments, a single signal device 202 is assigned to each consumable of a torch to transmit pertinent information about the corresponding consumable. In some embodiments, two or more signal devices 202 are assigned to the same consumable to transmit different information about that consumable. For example, one signal device 202 can transmit information unique to the consumable type, such as the model number and operating parameters for the consumable type, while another signal device 202 can transmit information unique to the consumable itself, such as weight and usage history of the consumable. In some embodiments, the signal devices 202 in the communication network 200 employ different modes of data transmission. For example, while one signal device 202 transmits data as RF signals, another signal device 202 transmits data as optical signals. In some embodiments, the network 200 includes multiple receivers 204. Each receiver 204 is configured (e.g., tuned) to read signals from one or more of the signal devices 202 and transmit the extracted data to the processor 206. In some embodiments, a single receiver 204 is used to read signals from all signal devices 202 in the communication network 200. The processor 206 thus can simultaneously process data associated with multiple consumables.

Figure 4:
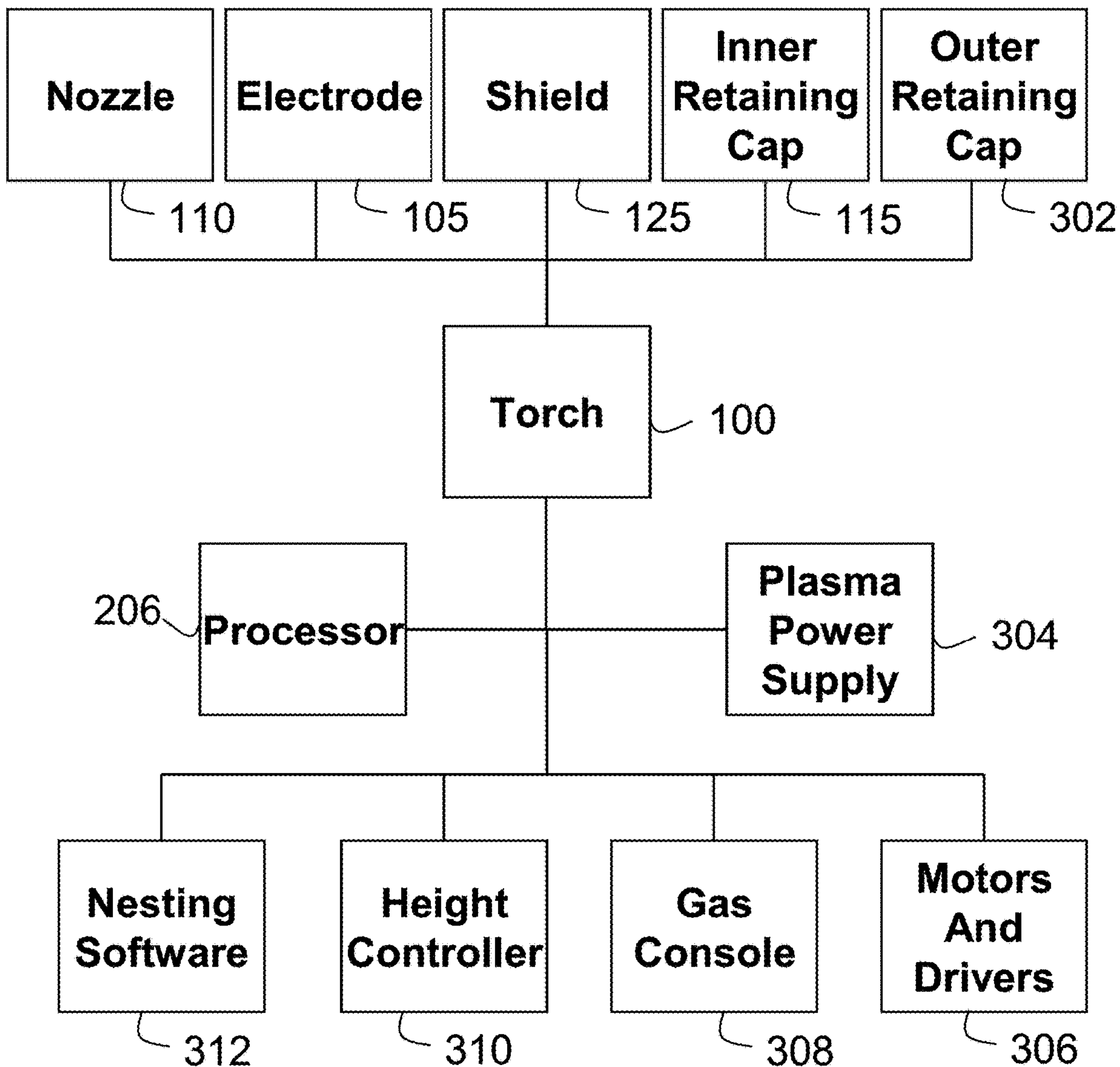
FIG. 4 is a schematic diagram of an exemplary thermal processing system using the communication network of FIG. 2 to control the operation of a thermal processing torch.

FIG. 4 is an exemplary thermal processing system 300 using the communication network of FIG. 2 to control the operation of a thermal processing torch, such as the plasma arc torch 100 of FIG. 1. The plasma arc torch 100 can include one or more consumables including the nozzle 110, the electrode 105, the shield 125, the inner retaining cap 115 and an outer retaining cap 302. At least one signal device 202 is assigned to at least one of the consumables for transmitting information about the corresponding consumable to the processor 206 via the receiver 204. The system 300 also includes a power supply 304 for providing the electrical current necessary to generate plasma arc in the torch 100. Data collected from the signal devices 202 about the respective consumables can be used by the processor 206 to control and optimize the operation of at least one of the plasma power supply 304, the motors and drivers 306, the gas console 308, the height controller 310 and the nesting software 312.

The processor 206 can be located inside or outside of the plasma arc torch 100. In some embodiments, the processor 206 is housed in the power supply 304. In some embodiments, each of the plasma power supply 304, the motors and drivers 306, the gas console 308, the height controller 310 and the nesting software 312 houses at least one processor for processing data from the signal devices 202 to control the functions of the respective module 304, 306, 308 or 310.

Based on the information collected from the signal devices 202, the processor 206 can regulate many plasma system functions simultaneously or near simultaneously and in real-time or near real-time. These system functions include, but not limited to, start sequence, CNC interface functions, gas and operating parameters, and shut off sequences. In some embodiments, the processor 206 uses consumable information to automatically set various parameters of the system 300. In some embodiments, the processor 206 uses consumable information to verify whether certain preset parameters of the system 300 are compatible with the consumables inside of the torch 100. As an example, based on the data collected about the multiple consumables of the torch 100, the processor 206 can control and verify one or more of the following system components: (i) settings of the power supply 304 for regulating power to the torch 100, (ii) settings of the nesting software 312 for processing a workpiece, (iii) settings of the gas console 308 for controlling shield and/or plasma gases supplied to the torch 100, (iv) settings of the height controller 310 for adjusting the height between the torch 100 and the workpiece, and (v) settings of various motors and drivers 306.

In some embodiments, based on the data collected from one or more signal devices 202, the processor 206 interacts with the nesting software 312 to automatically select a cutting program that sets parameters for processing a workpiece, such as the cutting speed, direction, paths, nesting sequences, etc. The cutting program can also define the gas types, gas pressure and/or flow settings and height control settings for the torch in view of the collected consumable data. Traditionally, when a set of consumables is assembled into a torch, an operator needs to manually configure the nesting software 312 to create the cutting program for the torch by supplying information to the software including the type and thickness of the workpiece material being processed, the type of gas being used, and the current rating of the consumable set. In particular, the operator needs to manually input into the processor 206 the current rating of the consumable set. In the present invention, because the current rating information for each consumable is stored in at least one signal device 202, the processor 206 can electronically collect such information from the one or more signal devices 202 and automatically determine the appropriate current setting without user input.

In some embodiments, based on the collected consumable data, the processor 206 selects a suitable cutting program from the nesting software 312 by taking into consideration of consumable data from the signal devices 202 and user-input operating parameters, including the characteristics of the workpiece being cut and the desired cut shape. For example, an operator can first send a generic program file to the nesting software 312. The generic program file specifies, for each workpiece thickness, variable cut speeds, gas flows, kerf compensations, torch heights, etc. that change with different consumable parts. Thus, after identifying the consumables using the signal devices 202, the processor 206 interacts with the generic program file to configure a cutting program for the torch. In some embodiments, after a cutting program is created, the processor 206 uses consumable data collected from the signal devices 202 to verify whether correct consumables are installed into the torch that are appropriate for the program. In addition, the processor 206 can instruct the nesting software 312 to automatically set or correct parameters of the program to enhance compatibility with the consumables loaded into the torch. For example, a consumable requiring 400 A current has larger kerfs and lead-ins in comparison to a consumable requiring 130 A current. Accordingly, the nesting software 312 can select fewer parts to fit on a nest of the program if the 400 A consumable is loaded into a torch.

In some embodiments, based on the data collected from one or more signal devices 202, the processor 206 can manipulate a gas console 308 to control flow of plasma and shield gases to the torch 100 by verifying and adjusting the gas console settings. The gas console 308 houses solenoid valves, flow meters, pressure gauges, and switches used for plasma and shield gas flow control. For example, the flow meters are used to set the pre-flow rates and cut flow rates for the plasma and shield gases. The gas console 308 can also have a multi-inlet gas supply area where the plasma and shield gases are connected. A toggle switch can be used to select the desired gases. The plasma and shield gases are monitored by gas pressure sensors. In one example, a signal device 202 associated with the shield 125 of the plasma arc torch 100 can store information about the type and composition of one or more shield gases suitable for use with the shield 125, along with the optimal flow rate setting of the shield gases. Based on this data, the processor 206 can interact with the gas console 308 to provide the plasma arc torch 100 with the appropriate shield gas at the optimal flow rate.

In some embodiments, based on the data collected from one or more signal devices 202, the processor 206 manipulates the torch height controller 310, which sets the height of the torch 100 relative to the workpiece. The torch height controller 310 can include a control module to control an arc voltage during cutting by adjusting the standoff (i.e., the distance between the torch 100 and the work piece) to maintain a predetermined arc voltage value. The torch height controller 310 can also include an external control module to control the standoff. The torch height controller 310 can further include a lifter, which is controlled by the control module through a motor or driver 306, to slide the torch 100 in a vertical direction relative to the workpiece to maintain the desired voltage during cutting. In one example, based on the data collected from the consumables of a torch, the torch height controller 310 can automatically determine the height to position the torch relative to the top of a workpiece. Therefore, the torch height controller 310 does not need to perform a height sense in order to set an appropriate pierce height and cut height before beginning arc voltage control. In some embodiments, based on the data collected from one or more signal devices 202, the processor 206 manipulates the motors and drivers 306 to move the torch 100 laterally in relation to the surface of the workpiece. The processor 206 can also manipulate the height controller 310 to move the torch 100 vertically in relation to the surface of the workpiece.

In some embodiments, the processor 206 is configured to prevent the thermal processing system 300 from commencing an operation on the workpiece if it determines that the consumables installed in the torch 100 are mismatched with each other, not compatible with the thermal processing system 300 or inconsistent with other pre-selected operating parameters input by an operator. If such a determination is made, the processor 206 can trigger an audio or visual alert indicating to the operator that one or more of the connected consumables are unsupported and that the consumables should be replaced or operator inputs should be revised. Additionally, the processor 206 can prevent initiation of an operation if an alert is triggered. For example, the processor 206 can stop torch operation if the current setting of the shield 125, which is conveyed to the processor 206 by a signal device 202 assigned to the shield 125, is different from the current setting of the nozzle 110, which is conveyed to the processor 206 by a different or the same signal device 202 corresponding to the nozzle 110.

In some embodiments, the processor 206 is configured to prevent the thermal processing system 300 from operating if it determines that at least one of the consumables installed in the torch 100 is not manufactured or otherwise supported by an accepted manufacturer. For example, the processor 206 can stop torch operation if it does not recognize the manufacturer identification, serial number and/or parts number conveyed by a signal device of a consumable. Hence, the thermal processing system 300 can be used to detect and prevent the use of inferior or counterfeit consumables.

In some embodiments, the processor 206 recommends one or more remedial actions to the operator to address alarm situations. For example, the processor 206 can suggest one or more consumables to install in the torch 100 to avoid potential mismatch with other components of thermal processing system 300. The processor 206 can suggest suitable types of workpiece for processing based on the ratings of the installed consumable set. The processor 206 can recommend a cutting sequence that reconciles the settings of the installed consumables with settings provided by the operator.

Generally, the signal devices 202 can store information about torch components other than consumables. For example, the signal devices 204 can store information about the torch body 102 or about one or more leads. Therefore, as one in the art will fully appreciate, the exemplary communication network 200 of FIG. 2 and the configuration of FIG. 3 can be easily adapted to store information about any torch component.

Figure 5:
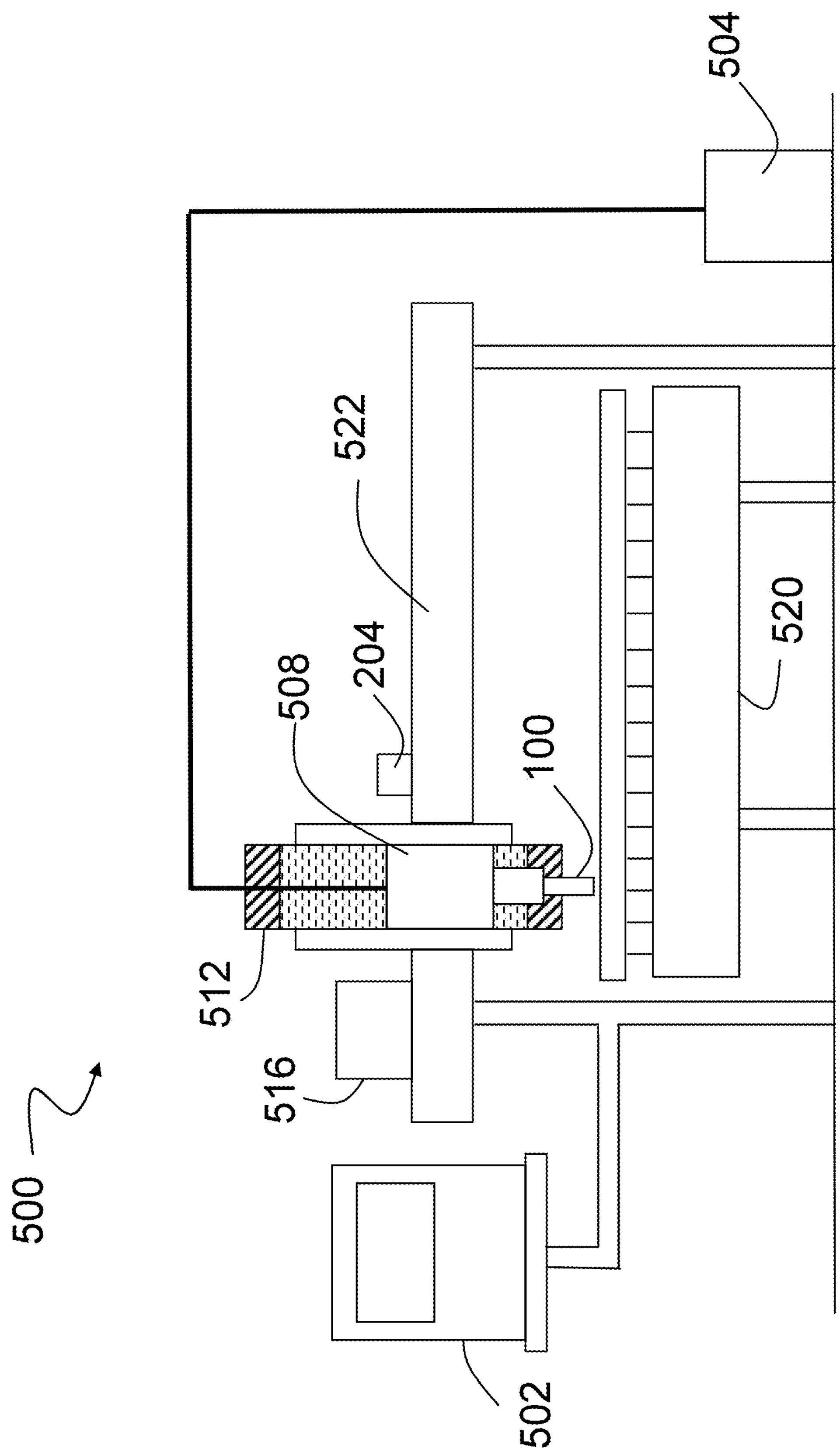
FIG. 5 is a diagram of another exemplary thermal processing system using the communication network of FIG. 2 to control the operation of a thermal processing torch.

FIG. 5 is another exemplary thermal processing system 500 using the communication network 200 of FIG. 2 to influence, control, or otherwise affect the operation of a thermal processing torch, such as the plasma arc torch 100 of FIG. 1. The thermal processing system 500 includes a computerized numeric controller (CNC) 502, a power supply 504, an automatic process controller 508, a torch height controller 512 and a driver system 516, which are similar to the processor 206, the power supply 304, the gas console 308, the height controller 310 and the motor and drivers 306, respectively, of the operating system 400. In addition, the thermal processing system 500 includes a cutting table 520, To operate the thermal processing system 500, an operator places a workpiece on the cutting table 520 and mounts the torch 100 into the torch height controller 512, which is attached to the gantry 522. The driver system 516 and the height controller 512 provide relative motion between the tip of the torch 100 and the workpiece while the torch 100 directs plasma arc along a processing path on the workpiece. In some embodiments, at least one receiver 204 is attached to a component of the thermal processing system 500 to receive signals emitted by at least one signal device 202 associated with one or more consumables of the torch 100. For example, a receiver 204 can be coupled to the gantry 522 to read signals from the torch 100 after the torch 100 is installed into the system 500. The receiver 204 can also be attached to other system components including, for example, the CNC 502, the height controller 512, the driver system 516 or the cutting table 520. In some embodiments, the receiver 204 is mounted inside or on the surface of the torch 100. In some embodiments, multiple receivers 204 are disbursed throughout the system 500 external to the torch 100, each receiver 204 being tuned to read data concerning one or more specific consumables of the torch 100. For example, while one receiver 204 is used to receive data from a signal device 202 assigned to a nozzle, another receiver 204 is used to read data from a signal device 202 assigned to a shield. After obtaining information from a signal device 202, the receiver 204 can transmit the information to the CNC 502, which uses the information to configure the thermal processing system 500 for processing.

In some embodiments, signal devices 202 associated with two sets of physically identical (or at least substantially identical) consumables are encoded with different consumable information and installed into two different torches. For example, a signal device for the nozzle of one torch can be encoded with Serial Number A while another signal device for the nozzle of a second torch can be encoded with Serial Number B, even though the two nozzles are manufactured to identical design specifications. The nozzles are installed into the respective torches. The two torches are installed into their respective thermal processing systems, and the receiver 204 of each thermal processing system can receive consumable data from the signal device 202 of each torch. In some embodiments, based on the different consumable data, the thermal processing systems are adapted to suitably adjust one or more operating parameters of the systems so as to operate the torches differently, even when the consumables of the two torches are physically identical to each other and all extraneous factors are the same (e.g., the material type and thickness of the workpieces being processed by the two torches are the same). For example, based on the different consumable data, the consumable data can cause the thermal processing systems to interact with the respective nesting software 312 to enable different cutting programs for the two torches and/or interact with the respective height controllers 512 to set different heights for the two torches. In general, based on the different consumable data, one thermal processing system corresponding to one torch can be configured to include features A, B, or C while a second thermal processing system corresponding to the other torch can be configured to include features X, Y or Z. In some embodiments, the same thermal processing system can be configured in different manners depending on the consumable data encoded in the two torches. Exemplary features customizable by a thermal processing system include: plasma gas flow and timing, shield gas flow and timing, cutting current and timing, pilot arc initiation and timing, torch height above the surface of a workpiece and/or torch lateral motion parallel to the surface of a workpiece.

In some embodiments, a thermal processing system is adapted to activate a proprietary process for operating a torch only after determining that the information about one or more consumables in the torch satisfies certain criteria, such as being manufactured by a specific manufacturer. This information is stored on one or more signal devices 202 coupled to the consumables, and may be accessed by the thermal processing system. Therefore, if the consumables are produced by a different manufacturer and do not have the correct (or any) information encoded in their signal devices 202, the thermal processing system does not initiate the proprietary process, even if the "incorrect" consumables are physically identical to the consumables produced by the desired manufacturer. In some embodiments, a thermal processing system does not initiate a proprietary process when the system does not sense any data from the torch consumable. This can occur if, for example, the consumable is not associated with a signal device 202 or the signal device is defective. Therefore, a configuration process executed by a thermal processing system can simply involve the system detecting whether a consumable is associated with the correct data and/or alert the operator if incorrect or no information is detected from the consumable. An exemplary alert include an alarm, a visual indicator, or a combination thereof. In addition, the system can prevent operation of a torch in response to detecting incorrect or no information from the consumable.

The various types of signal devices and receivers described herein can be arranged and packaged within plasma torch components (e.g., consumable components or a torch body) in any of various configurations that can provide adequate structural and thermofluidic protection, as well as enable necessary communication between the signal device and the receiver. For example, referring to FIG. 12, in some embodiments, a thermal processing torch 1200 can include multiple receivers (e.g., RIFD reading devices, for example, as discussed above) arranged at different locations along a torch body 1201. Each of the receivers are configured to communicate (e.g., read data) with one or more signal devices (e.g., readable or rewritable RFID devices, for example, as discussed above).

As illustrated, in some embodiments, a first receiver (e.g., a torch body RFID reader) 1204*a* is arranged within the torch body 1201 and is configured to communicate with various signal devices affixed to different torch components (e.g., consumable components). In particular, the receiver 1204*a* can communicate with (e.g., to identify or write to) one or more of a torch body signal device 1202*a* disposed on the torch body 1201, an electrode signal device 1202*b* disposed on an electrode 1205, a swirl ring signal device 1202*c* disposed on a plasma gas swirl 1220, and/or a nozzle signal device 1202*d* disposed on a nozzle 1210.

Additionally, a second receiver (e.g., a retaining cap RFID reader) 1204*b* is arranged along a structural element of a retaining cap 1215 of the torch in order to communicate with (e.g., to identify) one or more of an outer retaining cap signal device 1202*e* disposed on an outer retaining cap (e.g., a shield retaining cap) 1215, an inner retaining cap signal device 1202*f* disposed on an inner retaining cap (e.g., a nozzle retaining cap) 1217, and/or a shield signal device 1202*g* disposed along a shield 1225.

Figure 12:
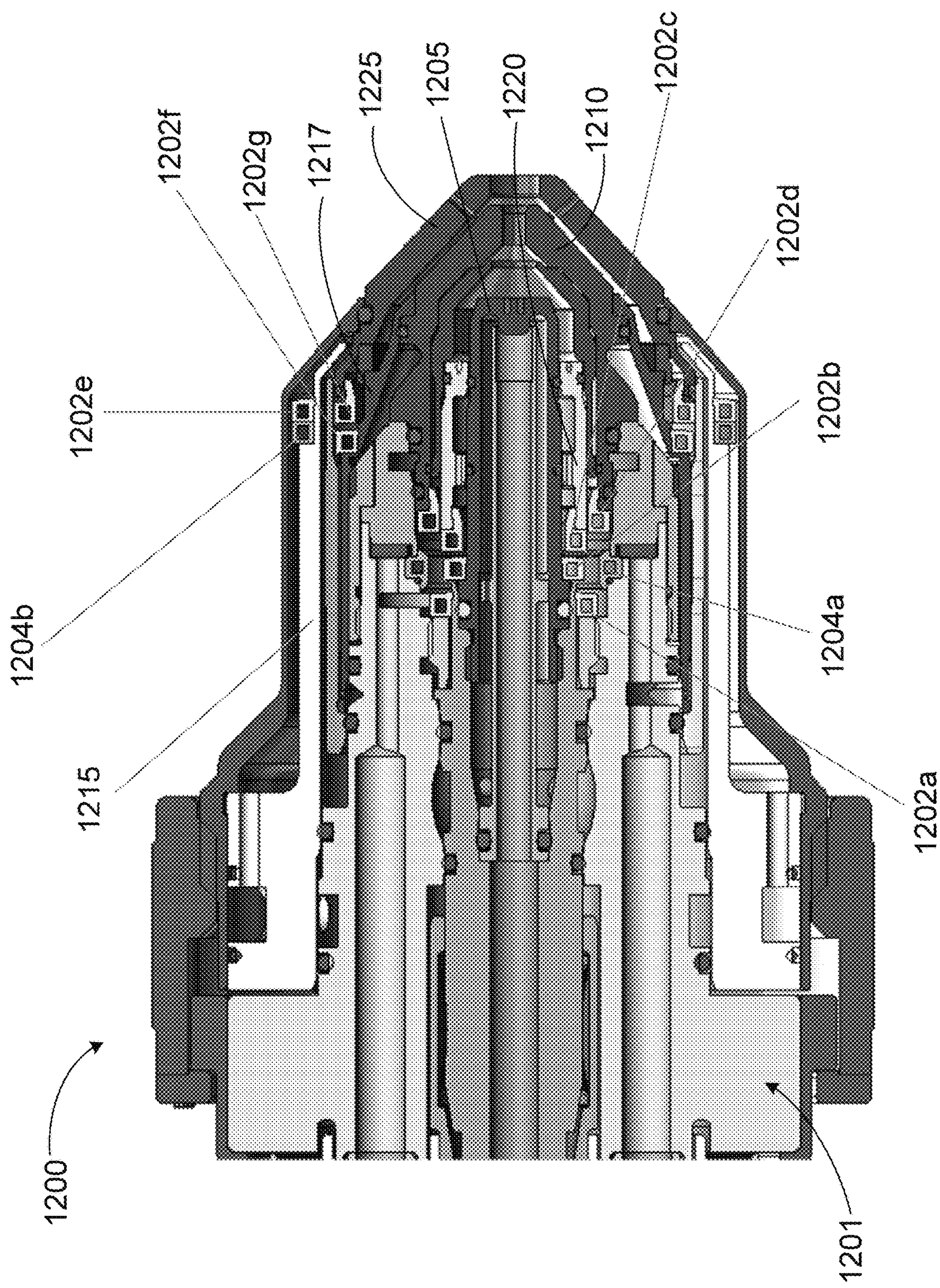
FIG. 12 is a cross-sectional view of an example thermal processing torch illustrating various signal devices affixed to various torch components.

As illustrated in FIG. 12, the signal devices are generally arranged within the respective components in order to help aid in the communication between the signal devices and the receivers. For example, each signal device is typically positioned relatively close to the receiver with which it is intended to communicate. While the permitted spacing between a receiver and a signal device can vary based on the types of devices being used and the type and amount of material surrounding or otherwise in the vicinity of the devices, the signal devices described herein are typically separated from a receiver by a spacing that is about 0 mm to about 10 mm (e.g., about 3 mm to about 6 mm). Additionally, as illustrated with respect to the torch body RFID reader 1204*a*, the spacing between the receiver and the various signal devices with which the receiver communicates is typically unobstructed by other components (i.e., little or no material (e.g., no metal material) is disposed in the spacing) to enable or improve communication capabilities between the torch body RFID reader 1204*a* and the signal devices with which is communicates. That is, obstructions (e.g., metal pieces) in between a receiver and signal devices can inhibit (e.g., prevent) effective communication between the devices, so such obstructions are typically avoided. To help enable effective communication between a signal device and a receiver, components that are disposed between the signal device and the receiver (e.g., the baffle of the shield retaining cap 1215) can be formed of non-metal materials, such as one or more of a variety of plastic materials.

The signal devices 1202*a-g* can be in various forms and configurations that are suitable to communicate with the receivers 1204*a*, 1204*b*. For example, in some embodiments, the signal devices are formed of circular, ring-like components containing or enclosing one or more RFID tags that store information relating to the various torch components on which they are installed. The ring-like signal devices can be affixed to the respective torch components by any of various connection techniques including threaded connections, adhesives or a welded connection, or a press or friction fit. Alternatively or additionally, in some embodiments, the ring-like signal devices can be integrally formed as a feature of the torch consumable. However, other arrangements and configurations are possible.

As discussed herein, the various signal devices can provide information associated with the consumable on which they are installed to the torch (e.g., the receivers on the torch) that can be used for torch system setup and use. For example, in some embodiments, using the signal devices, a torch system can identify the particular combination of consumables attached to the torch in order to automatically program torch operating parameters for use. The signal devices can also be used to provide a variety of other types of information to the torch system.

The signal devices described above can be used to execute one or more processes to transfer information to and from a thermal processing system.

For example, in some aspects, a thermal processing system (e.g., the thermal processing system torch 100) having a receiver (e.g., data reading and/or data writing device) 204 (or receiver 1204*a*, 1204*b*) that communicates with a signal device (e.g., the data storage device or data tag) 202 (or signal devices 1202*a-g*) disposed in or on a consumable component arranged within the torch can be used to transmit information (e.g., operating instructions or information about the torch use) between a controller (e.g., processor) 206 of the system and the consumable installed within the torch.

Figure 9:
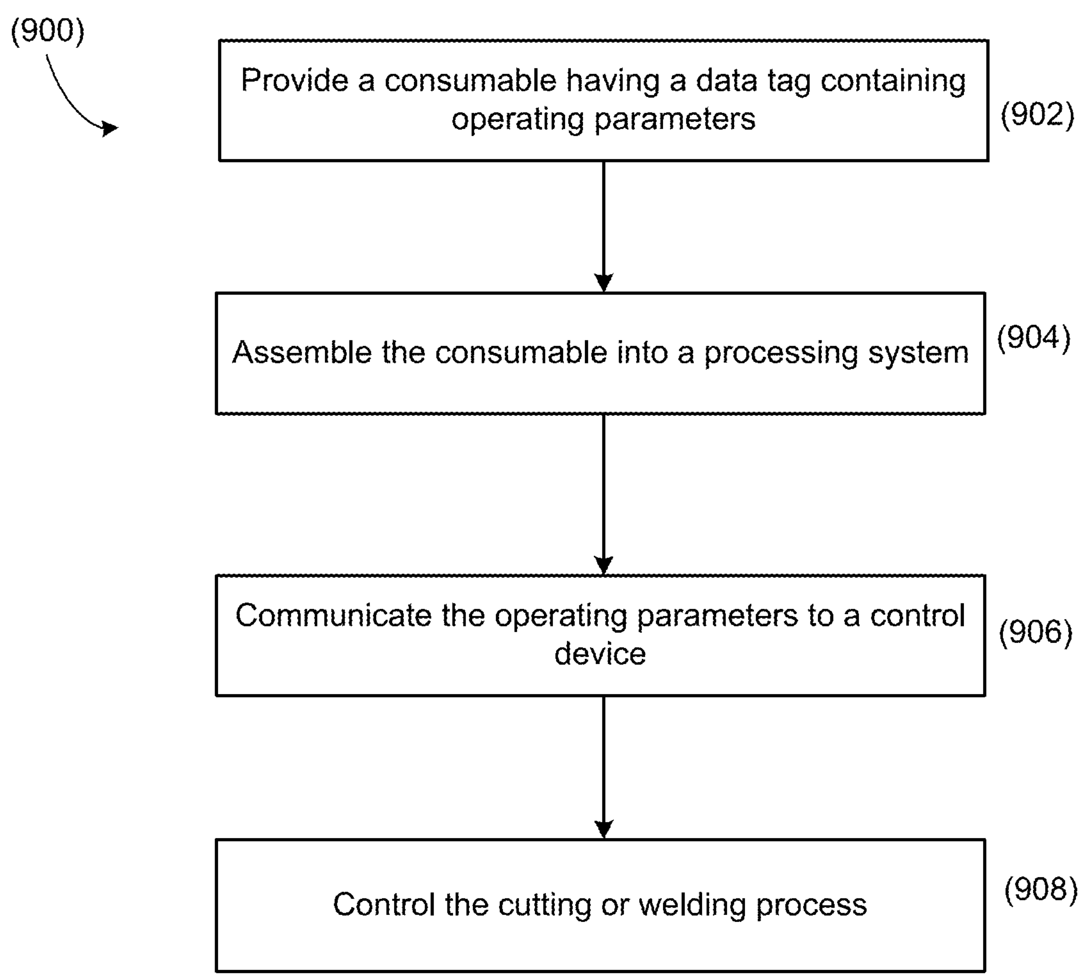
FIG. 9 is a flow chart illustrating an exemplary method for at least partially controlling a process of a thermal processing system using a data storage device disposed in or on a consumable component used by the thermal processing system.

For example, referring to FIG. 9, in some aspects, an exemplary method (900) for at least partially controlling a process of a cutting or welding system includes providing a consumable component (e.g., the electrode 105, the nozzle 110, the swirl ring 120, the shield 125, or other consumable components) having a readable data tag containing information (e.g., operating parameters) (902). For example, the data tag can include the signal device 202 (or signal devices 1202*a-g*) and, as discussed above, can be in the form of an RFID tag or an optical tag having a visual characteristic to convey information about the consumable component. In some cases, the data tag is rewritable, for example, while the data tag is arranged in the torch.

The consumable component is then assembled into a processing system (904). For example, the consumable component can be installed into a tool (e.g., a torch) of a cutting or welding system. In some cases, the consumable component is inserted into a designated recess within the torch and held in place via any of various retention mechanisms, such as threaded connections (e.g., threaded retaining caps).

With the consumable component in place within the torch, the operating parameters can be communicated (e.g., sent) to a control device of the processing system (906). For example, in some embodiments, the signal device (e.g., readable data tag) is placed in communication (e.g., wired or wireless communication) with the receiver (e.g., the data reading device) disposed within the torch. In some examples, the data tag is an RFID tag and is placed in wireless communication (e.g., near-field communication) by which the data reading device can read the operating parameters from the data tag and transmit the information (e.g., operating parameters) to the thermal processing system.

Once the data reading device has read and transmitted the operating parameters to the thermal processing system, the thermal processing system can control a process (e.g., a cutting or welding process) in accordance with the operating parameters communicated from the data tag (908). As discussed herein, the operating parameters contained on the data tag of the consumable component can include any of various parameters including a cutting program, cutting applications, an electrical current (e.g., ignition or cutting current) or gas (e.g., plasma or shield gas) ramping profile, set up values for the thermal processing system, cut cycle or life data of the torch of consumables, gas flow rates (e.g., ignition or cutting gas flow rates), gas types (e.g., gas selection instructions), pierce delay time, timing parameters, set points, error conditions, thresholds, or a coordination of multiple parameters.

In some cases, as a result of transferring information (e.g., operating parameters, instructions, or programs) from the readable storage device to the data reading device, an operator of the thermal processing machine is not required to manually input as many operating parameters that would be required if the operating data was not transferred. That is, in some aspects, using the method 900 of using consumable components having readable data tags can permit automated or semi-automated setup and operation of the thermal processing machine.

Figure 10:
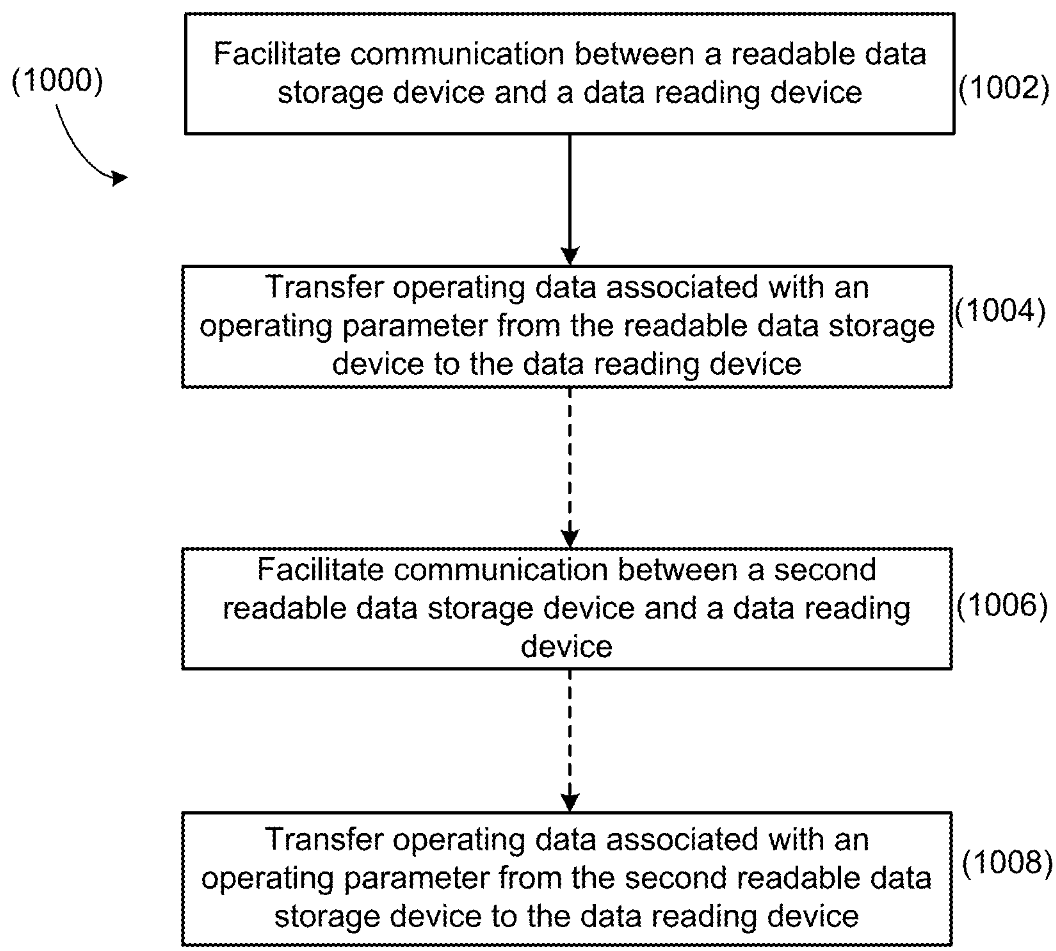
FIG. 10 is a flow chart illustrating another exemplary method for providing information to a thermal processing system using a data storage device disposed in or on a consumable component used by the thermal processing system.

In some embodiments, the methods of transferring information from a signal device of a consumable to a processing system can be executed in combination with methods for identifying consumables based on physical features of consumables. For examples, in some cases, one consumable installed into a torch can include a signal device configured to transfer information to the torch system and another consumable installed into the torch can be identified using physical features of the consumable. For example, as discussed with reference to FIGS. 7-8, changes in fluid flow in or around various consumables can be monitored and used in order to identify consumables installed in the torch In some aspects, referring to FIG. 10, an example method (1000) for providing information (e.g., an operating parameter) to a thermal processing system (e.g., a cutting or welding system) using a replaceable consumable component having a readable data storage device (e.g., the signal device 202 or the signal devices 1202*a-g*) includes first facilitating communication (e.g., wired or wireless communication) between the readable data storage device and a data reading device (e.g., the receiver 204 or the receivers 1204*a-b*) of the cutting or welding system (1002). For example, as discussed herein, the readable data storage device can be in the form of an RFID tag and can be placed in wireless communication (e.g., near-field communication) with the readable data storage device.

Once communication is established between the readable data storage device and the data reading device, information (e.g., operating data at least partially defining the operating parameter) is transferred from the readable data storage device to the data reading device (1004). For example, the operating data is typically configured to affect an operation of the cutting or welding system. As discussed herein, the operating data contained on the data tag of the consumable component can be configured to affect any of various operation characteristics including a cutting program, cutting applications, an electrical current (e.g., ignition or cutting current) or gas (e.g., shield or plasma gas) ramping profile, set up values for the thermal processing system, cut cycle or life data of the torch of consumables, gas flow rates (e.g., ignition or cutting gas flow rates), gas types (e.g., gas selection instructions), pierce delay time, timing parameters, set points, error conditions, thresholds, or a coordination of multiple parameters. In some cases, as discussed above, the information sent from the storage device can include software information for the thermal processing system. For example, in some examples, the consumable can contain firmware updates for the thermal processing system. In some cases, the controller can determine the firmware version being used by the thermal processing system and compare it to a version of the firmware update contained on the readable data storage device in order to determine whether the firmware update residing on the readable data storage device is newer than that being used.

In some cases, the operating parameters can be divided and distributed onto two or more data storage devices arranged on two or more replaceable consumable components (e.g., a nozzle and an electrode, a nozzle and a shield, or any other combinations of consumables) that can be installed into a torch. For example, in some embodiments, the method (1000) also includes facilitating communication (e.g., wired or wireless communication) between a second readable data storage device and a data reading device (e.g., the receiver 204 or the receivers 1204*a-b*) of the cutting or welding system (1006). For example, as discussed herein, the readable data storage device can be in the form of an RFID tag and can be placed in wireless communication (e.g., near-field communication) with the readable data storage device. The second readable data storage device can be placed in communication with the same data reading device with which the first readable data storage device is in communication or a different data reading device (in communication with a common controller as the first reading device) arranged within the torch. Once communication is established between the readable data storage device and the data reading device, operating data at least partially defining the operating parameter is transferred from the readable data storage device to the data reading device (1004).

By dividing or distributing data onto different consumable components, less data is typically required to be stored on a single signal device which can result in easier to configure, program, and manage signal devices. Additionally, dividing data onto different consumable components is expected to create a more versatile and customizable thermal processing system as a result of different consumable components being able to be mixed and matched in various different configurations while properly providing adequate operating parameters to the torch system.

Figure 11:
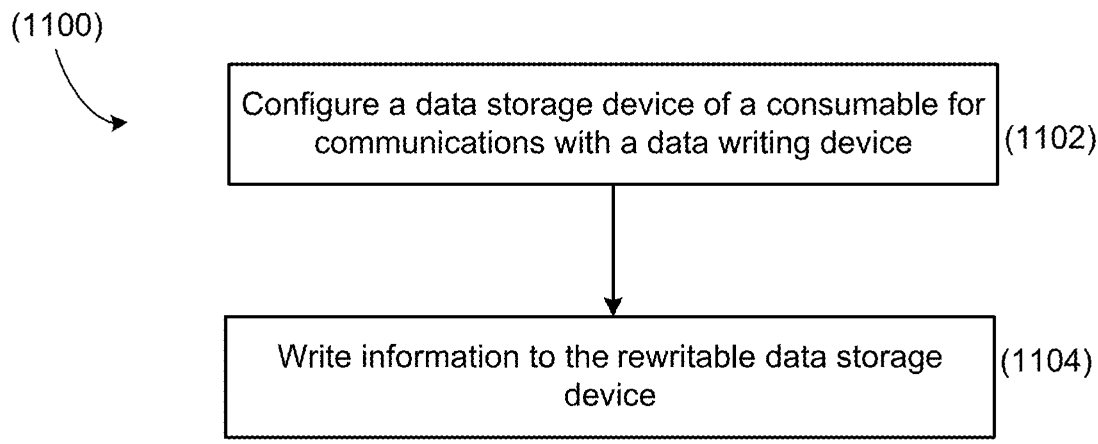
FIG. 11 is a flow chart illustrating an exemplary method for storing information from a thermal processing system to a data storage device disposed in or on a consumable component used by the thermal processing system.

In some aspects, information can be transmitted from the thermal processing system and stored onto the data storage device disposed in or on a consumable component while the replaceable consumable component is in an operation configuration. For example, referring to FIG. 11, an example method (1100) for storing information on a replaceable consumable component used in a thermal processing machine includes configuring a data storage device (e.g., the signal device 202 or the signal devices 1202*a-g*) for communication with a data writing device (e.g., the receiver 204 or the receivers 1204*a-b*) (1102). For example, in some embodiments, the data storage device is a rewritable data storage device (e.g., a rewritable RFID tag). That is, a rewritable data storage device is typically able to add new data after the initial writing of data (e.g., with or without deleting or overwriting other data present on the data storage device). In particular, the rewritable data storage device is typically able to have new data written while disposed within the torch. In some embodiments, the operation configuration includes the consumable component being installed within a torch of the thermal processing system ready for use. In some cases, the operation configuration includes the thermal processing system being turned on for operation (e.g., being used). For example, the operation configuration can include the torch being in use (e.g., undergoing a processing (e.g., cutting) operation in the field).

Once configured, the information can be written to the data storage device (1104). For example, in some embodiments, the data writing device transmits (writes) information to the data storage device. The information transmitted to the rewritable storage device can be associated with the thermal processing system, the torch in which the consumable is installed, or a previous use (e.g., a cutting or welding operation) of the replaceable consumable component in or on which the rewritable storage device in installed. For example, as discussed above, the information can include information relating to the frequency of use (e.g., how many cutting or welding operations for which the replaceable consumable component has been used over a given time), relating to a number (e.g., a total number) of cutting cycles for which the replaceable consumable component has been used, or relating to a time duration of the previous use of the replaceable consumable component (i.e., how long the torch was in operation during the previous use.

In some embodiments, the information can relate to the operating parameters of the thermal processing machine during the previous use of the replaceable consumable component. In some cases, the information relates to a failure or error of the torch, consumable, or thermal processing system during the previous use. In some cases, the thermal processing system is configured to periodically (e.g., repeatedly or continually) write data to the rewritable storage device while the consumable is disposed (e.g., operationally installed) within the torch (e.g., during use of the torch). Such information written to the data storage device can potentially be used for various purposes. For example, the information could be used to track usage in order to troubleshoot the machine, in order to review and handle warranty issues (e.g., by being able to observe how an operator was previous using the consumable and thermal processing system prior to inquiring about a warranty), or in order to predict the end of life of the consumable.

In some embodiments, as a result of use data being written to the data storage device as the consumable is used, the operating parameters transferred from the data storage device to the torch controller during subsequent installations into a torch can be altered or updated based on prior use of the consumable. That is, as a particular consumable is used for longer time periods, the preferred operating parameters can change so that the operating parameters transferred to the torch to set up use of the particular consumable can be changed accordingly. For example, as an electrode gets closer to its end of life and the electrode's emitter wears, the preferred torch height setting (e.g., height away from a workpiece during use) may need to be adjusted to compensate for the arc emitting from the electrode a deeper point from the face of the electrode than occurs with an unused electrode.

Figure 6A:
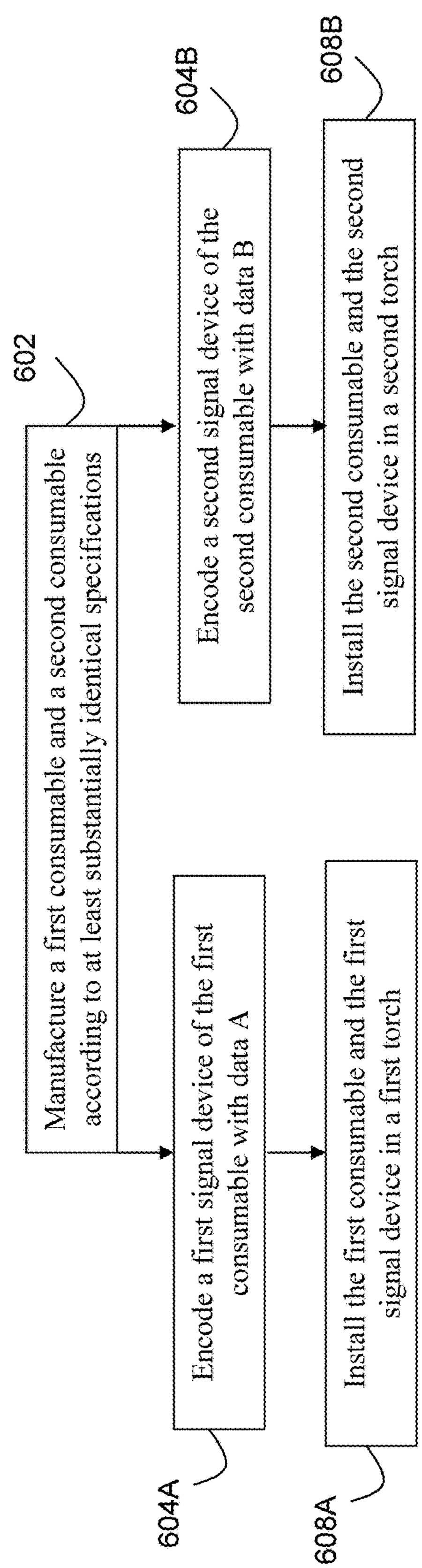
FIGS. 6A and 6B are flow charts illustrating exemplary operations of the communication network of FIG. 2.
Figure 6B:
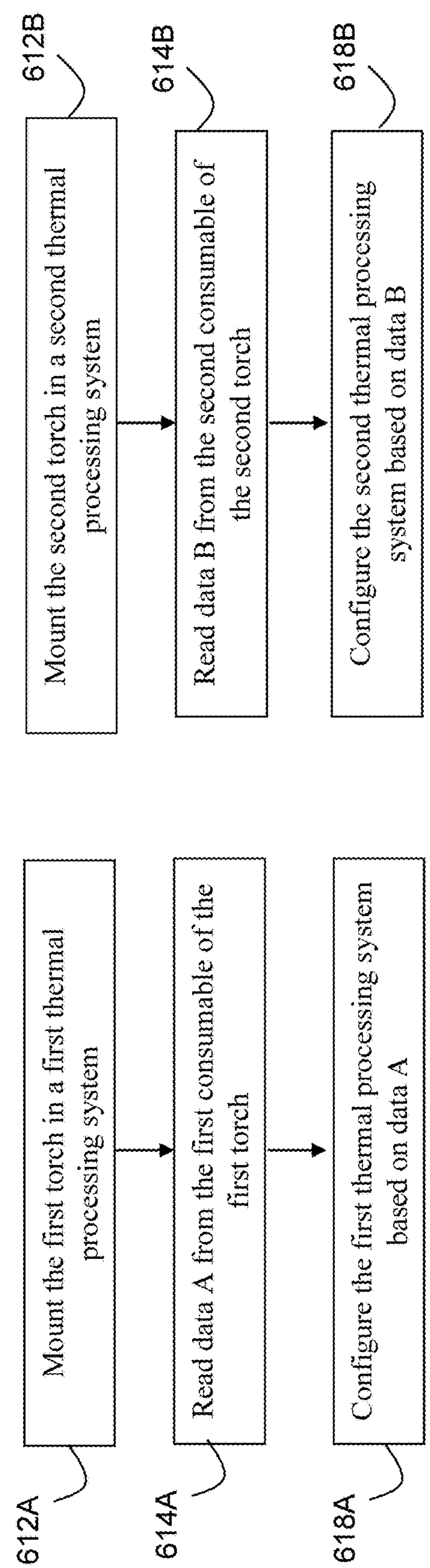

FIGS. 6A and 6B are flow diagrams illustrating exemplary operations of the communication network 200 of FIG. 2. FIG. 6A illustrates an exemplary process for assembling thermal processing torches to include one or more consumables and signal devices 202. Specifically, at step 602, two consumables are provided, with both consumables manufactured based on the same, or substantially the same, physical specifications. As a result, the two consumables have identical, or substantially identical, physical characteristics. A signal device 202, such as an RFID tag, can be coupled to each of the two consumables. Each signal device 202 can be located on or within the body of the corresponding consumable. At steps 604A and 604B, the signal device 202 for each consumable is encoded with data that can be used to determine system configuration settings for operating the corresponding torch. For example, one consumable can be encoded with data A while the other consumable can be encoded with data B, where data A and data B can be used to set one or more operating parameters of the respective thermal processing systems for operating the respective torches. In some embodiments, data A and data B include different serial numbers assigned to the respective consumables, which correlate to different values for setting the operating parameters of the thermal processing systems. Exemplary operating parameters associated with a thermal processing system include a height of the torch above a workpiece, a flow rate of a plasma gas through the torch and a cutting program for processing a workpiece using the torch. At steps 608A and 608B, each consumable manufactured at step 602, along with its respective signal devices 202, is assembled into a torch.

FIG. 6B illustrates an exemplary process for configuring two thermal processing systems, such as the thermal processing system 400 of FIG. 4 or the thermal processing system 500 of FIG. 5, in preparation for operating the two torches of FIG. 6A. At steps 612A and 612B, the torches are mounted into their respective thermal processing systems. With reference to the thermal process system 500, each torch can be mounted on the gantry 522 above the cutting table 520. At steps 614A and 614B, receivers 204 of the respective thermal processing systems are used to read the consumable data encoded in the signal devices 202 of the corresponding consumables. For example, at step 614A, a receiver 204 can read data A from the signal device 202 associated with the consumable of the first torch. At step 614B, another receiver 204 can read data B from the signal device 202 of the consumable of the second torch. At steps 618A and 618B, the receivers 204 of the thermal processing systems forward the data to the respective CNC's of the thermal processing systems, which set and/or adjust certain parameters of the corresponding thermal processing systems based on the received data to operate the corresponding torches. In some embodiments, the difference in the encoded data for the two consumables translates to different values for setting the operating parameters of the thermal processing systems, even though the consumables are physically identical to each other. In some embodiments, the thermal processing systems assign the same values to the operating parameters despite the dissimilarity in the encoded data.

In some embodiments, the method described with reference to FIG. 6B is implemented by a single thermal processing system, which is adapted to set operating parameters of the system for operating both torches either simultaneously or sequentially (i.e., one torch at a time).

In addition, as one in the art will fully appreciate, the invention described herein is not only applicable to plasma cutting devices, but also welding-type systems and other thermal processing systems. In some embodiments, the invention described herein is configured to operate with a variety of cutting technologies, including, but not limited to, plasma arc, laser, oxy fuel, and/or water-jet technologies. For example, the signal devices 202 can be coupled to one or more consumables configured to operate with one or more of the cutting technologies. The processor 206, using information transmitted by the signal devices 202, can determine whether the consumables installed in a torch are compatible with the specific cutting technology. In some embodiments, based on the selected cutting technology and the consumable information, the processor 206 can set or adjust operating parameters accordingly, such as the height of the cutting head above the workpiece, which can vary depending on the cutting technology and the consumables.

As an example, it is known to use water-jet systems that produce high pressure, high-velocity water jets for cutting various materials. These systems typically function by pressurizing water or another suitable fluid to a high pressure (e.g., up to 90,000 pounds per square inch or more) and force the fluid through a small nozzle orifice at high velocity to concentrate a large amount of energy on a small area. An abrasive jet is a type of water jet, which can include abrasive materials within the fluid jet for cutting harder materials. In some embodiments, the signal devices 202 are attached to consumables of a water-jet system, such as to a water jet nozzle, an abrasive-jet nozzle, a mixing tube used to mix abrasive particles with fluid, and/or one or more valves and filters. A signal device 202 associated with an abrasive-jet nozzle can identify, for example, the types of abrasives suitable for use with the nozzle, the amount of pressure in the pressurized fluid that can be fed to the nozzle, and can also indicate other consumables that are suitable for use with a particular nozzle. Identification of particular consumable set combinations for a given water-jet system can also be performed, to verify compatibility with a given system or to limit operating conditions and parameters, such as maximum pressure or flow settings, or abrasive types or amounts.

In addition to using signal devices, in some aspects, thermal cutting systems (e.g., plasma arc cutting torches) can also include devices and features that enable detection (e.g., identification) of consumable components installed within the torch by directing a gas flow through the torch (e.g., through a feature of the consumable component) and detecting the manner in which the gas flow is altered as it flows through the torch and the consumable component. For example, in some embodiments, a gas flow is directed through features (e.g., flow-restriction elements including vent holes or gas exit orifices) arranged on a consumable (e.g., a nozzle). Based on observed changes in one or more fluid flow characteristics (e.g., gas pressure or flow rate) upstream and downstream of the flow-restriction elements, the size of the flow-restriction elements, and therefore the consumable itself, can be estimated (e.g., identified).

Figure 7:
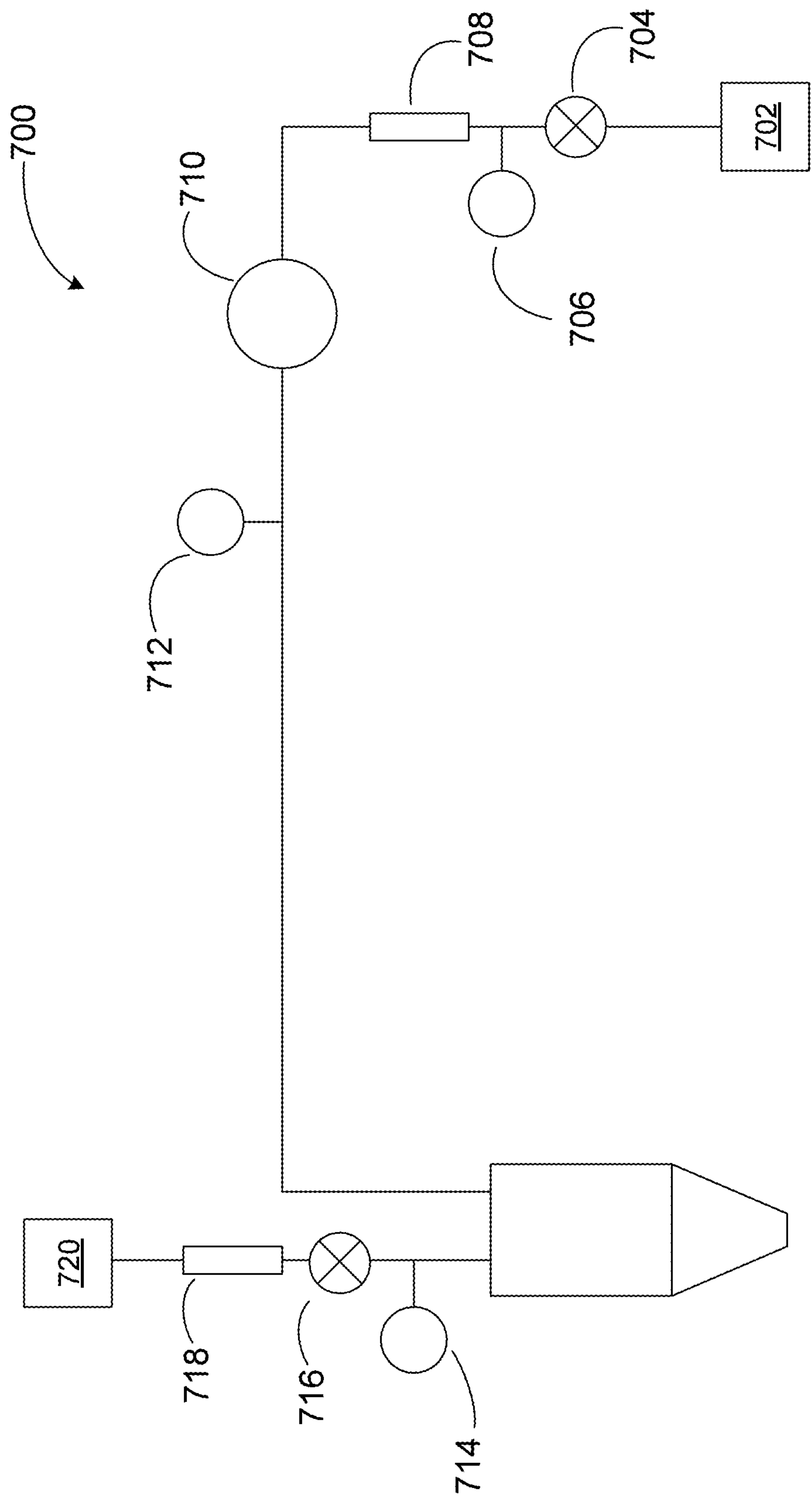
FIG. 7 is a schematic diagram of an exemplary torch gas delivery system including flow detection devices for identifying consumable components installed within a torch of the exemplary torch system.

To monitor gas flow through a torch system, the plasma arc torch system can include various gas flow detection devices, such as valves, pressure detectors, pressure regulators, gas flow meters, and other devices, which can all be fluidly connected to one another by gas tubing (e.g., semi-rigid tubing or flexible hose). Referring to FIG. 7, in some embodiments, a gas delivery system 700 for delivering gas to a torch (e.g., a torch head) 701 can include a gas supply (e.g., a compressed air tank or air compressor) 702, a supply off-valve 704, a supply pressure sensor 706, a supply gas flow detector 708, a supply gas pressure regulator 710, an off-valve pressure sensor 712, a torch plasma plenum pressure sensor 714, a vent off-valve 716, a torch vent gas flow detector 718, and a torch vent gas outlet 720. Some or all of these components can be in communication (e.g., wireless or wired communication) with a control unit (e.g., a processor within a torch system control unit) for monitoring and controlling the gas delivery system. Based on the configurations of these various components, gas flows can exit the torch from one or more different areas. For example, when a gas flow enters the torch head 701, a gas stream G1 is typically expelled out from the torch head (e.g., via the nozzle orifice). The gas stream G1 generally includes gas that would typically be used to generate a plasma stream and process a material. Additionally, for torch systems having a vent system, a second gas stream G2 can be emitted from the torch via the vent system based on whether or not certain components of the vent system (e.g., the vent off-valve 716) are opened or closed. In particular, in some embodiments, a gas stream G2 is emitted from the torch head when the vent off-valve 716 is open. The gas stream G2 can be caused by gas flowing within the various flow channels and orifices within the torch head (e.g., out of a vent hole in a consumable (e.g., a nozzle)). That is, as illustrated schematically, gas flow can enter the torch via the off-valve hose and be divided into the gas stream G1 and the gas stream G2 within the within the torch head while the gas flows through the consumable components arranged within the torch. For simplicity, the division of the gas within the torch into the gas stream G1 and gas stream G2 is schematically illustrated without showing the consumable components.

The various gas delivery components can be arranged in any number of various different configurations relative to one another as part of the torch system. For example, in some embodiments, the gas supply 702 is fluidly connected (e.g., via rigid gas lines) to a torch system control unit. The supply off-valve 704, supply pressure sensor 706, and supply gas flow detector 708 can all be housed within the torch system control unit. The supply gas pressure regulator 710 and the off-valve pressure sensor 712 can be located separately from the control unit, for example, disposed on or within a torch gas supply lead line connected to the control unit for providing gas and electricity to a torch. In some embodiments, the off-valve pressure sensor 712 can be disposed closer to the torch. In some embodiments, the supply gas pressure regulator 710 and the off-valve pressure sensor 712 are arranged near (e.g., within 10 feet of (e.g., within 6 feet of)) a torch connected to the lead line at an end opposite the control unit. By arranging these components closer to the torch, gas pressure controlled and monitored within the lead line by the supply gas pressure regulator 710 and the off-valve pressure sensor 712 can more closely represent the actual pressure delivered to the torch.

As illustrated, these various components can be connected to one another by any of various structurally and chemically suitable tubes or hoses. Examples of suitable hoses include flexible hoses (e.g., flexible plastic or rubber hoses), rigid tubing (e.g., rigid metal, plastic or composite tubing), or tubing made of a combination of flexible and rigid layers, such as a flexible hosing having a braided outer component (e.g., a braided sheath). To measure and control gas pressure within various gas passageways of a torch head, the gas passageways can be fluidly connected to gas flow measurement devices (e.g., gas pressure or flow sensors). Alternatively, in some cases, gas flow measurement devices can be arranged within the torch head.

Figure 8:
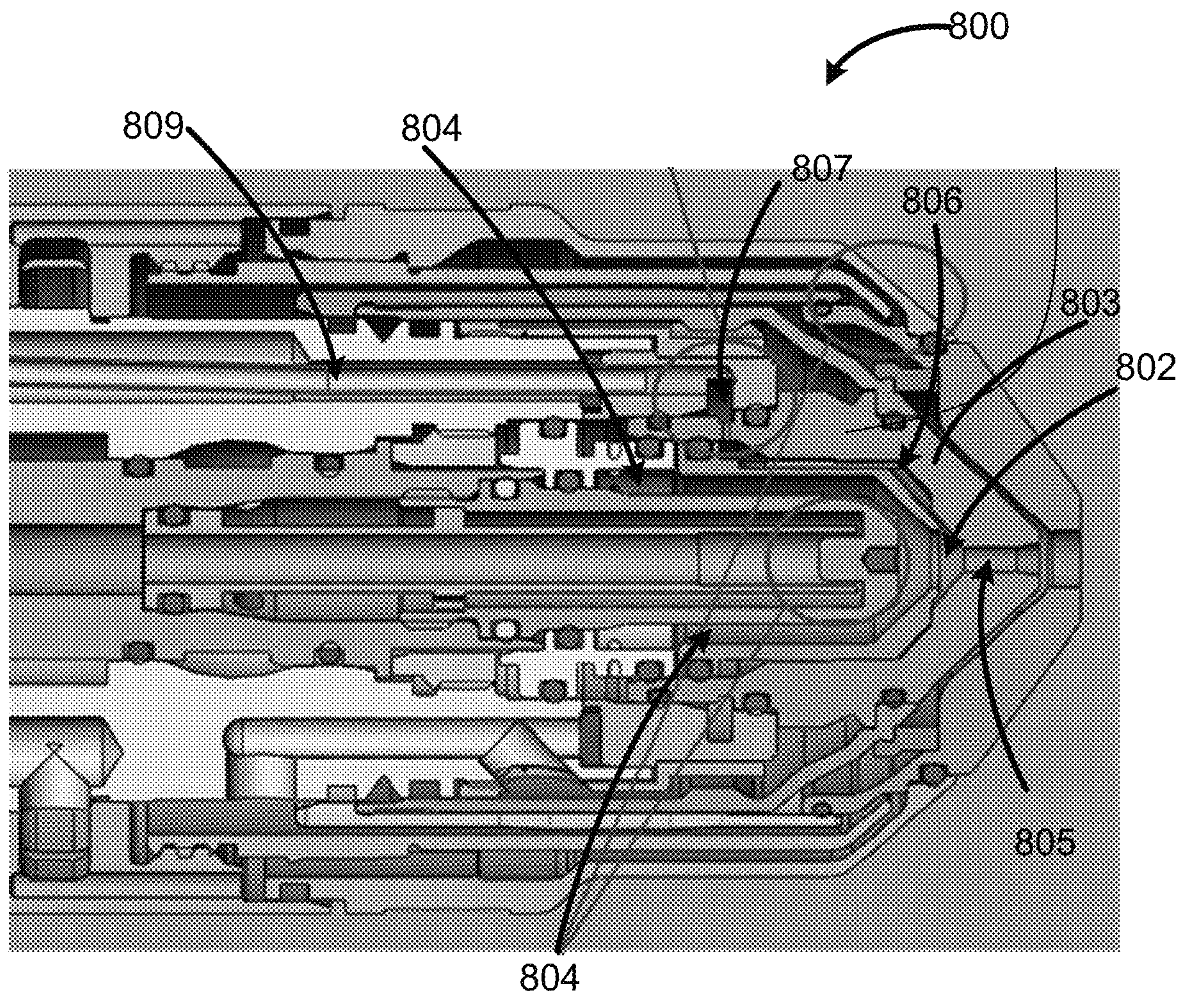
FIG. 8 is a cross-sectional view of an exemplary plasma arc torch illustrating geometric features within the plasma arc torch that can be utilized for identifying consumable components installed within a torch.

Referring to FIG. 8, in some embodiments, a torch 800 includes a plasma chamber 802 located at an end of a consumable (e.g., nozzle) 803 having one or more flow-restriction elements (e.g., a nozzle exit orifice 805 or a nozzle vent hole 807). The plasma chamber 802 can be fluidly connected to a pressure sensor (e.g., the torch plasma plenum pressure sensor 714) so that gas pressure within the plasma chamber 802 and/or the plasma plenum 806 can be monitored and measured. In some cases, the plasma chamber 802 is fluidly connected to the pressure sensor via the plasma plenum 806 fluidly connected to a vent line 809. During use, gas (e.g., plasma cutting gas) can be delivered from the gas delivery system 700 to the gas supply region 804, and then be directed to the plasma plenum 806 (towards the vent hole 807 and vent system) and/or be directed through orifice 805 expelled out of the torch. In some cases, the consumable installed within the torch can be identified by directing and monitoring gas flow through these flow-restriction elements (e.g., the vent hole 807 and/or the orifice 805).

In some embodiments, consumables can be detected (e.g., identified) by first closing a torch vent valve (e.g., the vent off-valve 716) to limit gas from flowing out the torch vent system (e.g., through the plasma plenum 806, nozzle vent hole 807, and vent line 809). With the vent closed, pressure supplied to the torch can be adjusted (e.g., via the gas regulator 710) to achieve a predetermined pressure within the plasma plenum (e.g., 4 psig). In some cases, once the predetermined pressure achieved, the consumable can be identified. For example, in some cases, the gas flow provided to the torch (e.g., as measured by the supply gas flow detector 708) can be measured and compared to expected values for different torch consumables to indicate the type of consumable installed in the torch. For example, measured values can be compared to a lookup table of previously measured values for various particular consumables. Alternatively or additionally, in some cases, the pressure of gas flow upstream of the torch that is needed to achieve the predetermined pressure in the plasma plenum (e.g., as measured by the off-valve pressure sensor 712) can be measured and used to identify the consumable installed in the torch. For example, the measured gas pressure can be compared to expected pressure values for different consumables.

Alternatively or additionally, in some embodiments, once the predetermined gas pressure is achieved, the vent can be opened (e.g., by opening the vent off-valve 716) and the flow characteristics can be observed to identify the consumable. When the vent off-valve is opened, some gas will flow from the plasma plenum, through the nozzle vent hole, and out of the vent (i.e., the gas stream G2). While the vent is then opened to atmospheric pressure, it is expected that the plasma plenum pressure will not significantly drop (e.g., will not significantly drop below the predetermined pressure) so that there will be a certain pressure upstream of the vent hole (e.g., in the plasma plenum, such as the predetermined pressure), a different (e.g., atmospheric) pressure downstream of the vent hole, and a gas flow therethrough. In some cases, the gas flow through the vent hole can be measured by vent gas flow detector 718 or by supply gas flow detector 708. In this manner, the pressures upstream and downstream of the flow-restriction element (e.g., the nozzle vent hole) and the gas flow therethrough can be measured and used to identify the consumable. For example, the measured values can be compared to example expected values (e.g., lookup tables of empirical data) associated with different consumables to identify the consumable.

While certain embodiments of using flow characteristics to identify consumables have been described, other embodiments are possible.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification. The present application includes such modifications and is limited only by the scope of the claims.

What is claimed is:

1. A replaceable consumable component of a torch tip in a thermal processing torch for performing a cutting operation, the thermal processing torch in electrical communication with a power supply located external to the thermal processing torch, the replaceable consumable component of the torch tip in the thermal processing torch comprising:

a body; and a readable data storage device, comprising a radio-frequency identification (RFID) tag, integrated with the body, the readable data storage device includes an operation instruction for operating the thermal processing torch, wherein (i) the readable data storage device is inserted within the thermal processing torch upon installation of the replaceable consumable component in the thermal processing torch and (ii) the readable data storage device is positioned on the body to maintain an unobstructed signal communication path to an RFID reader and is readable by the RFID reader from inside of the thermal processing torch.

2. The replaceable consumable component of claim 1, wherein the operation instruction comprises a cutting program.

3. The replaceable consumable component of claim 2, wherein the cutting program comprises torch system setup values.

4. The replaceable consumable component of claim 1, wherein the operation instruction comprises a workpiece cutting application.

5. The replaceable consumable component of claim 1, wherein the operation instruction comprises a firmware update.

6. The replaceable consumable component of claim 1, wherein the readable data storage device is also rewritable.

7. A torch for a cutting process of a thermal processing system that includes a power supply and a controller located external to the torch and in electrical communication with the torch, the torch comprising:

a replaceable consumable component;

a readable data storage device located in or on the replaceable consumable component;

a data reading device in the torch for reading the readable data storage device; and a data transfer mechanism enabling communication between the data reading device and the controller of the thermal processing system, wherein the readable data storage device includes data for operating the thermal processing system, wherein the readable data storage device is inserted within the torch upon installation of the replaceable consumable component in the torch, and wherein the torch is configured to maintain an unobstructed communication path between the readable data storage device and the data reading device inside of the torch.

8. The torch of claim 7, wherein the unobstructed communication path inside of the torch comprises substantially no metal material in the unobstructed communication path.

9. The torch of claim 7, wherein the data transfer mechanism comprises a wireless connection.

10. The torch of claim 7, wherein the readable data storage device is rewriteable.

11. The torch of claim 10, wherein the readable data storage device is at least one of writable while in service or while disposed within the torch.

12. The torch of claim 7, wherein the data comprises a cutting program.

13. The torch of claim 7, wherein the data is configured to produce an altered performance characteristic of the thermal processing system.

14. The torch of claim 13, wherein the altered performance characteristic comprises a better cut quality capability relative to an original cutting capability that would be possible using a substantially similar replaceable consumable component that does not transfer the data.

15. The torch of claim 7, wherein the data comprises a firmware update for the thermal processing system.

16. The torch of claim 7, wherein the data reading device comprises an RFID reading device.

* * * * *